United States Patent
Ma et al.

(10) Patent No.: US 12,550,126 B2
(45) Date of Patent: Feb. 10, 2026

(54) TECHNIQUES FOR RELAXING A SLOT FORMAT DETERMINATION

(71) Applicant: QUALCOMM INCORPORATED, San Diego, CA (US)

(72) Inventors: Ruifeng Ma, Beijing (CN); Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/758,542

(22) PCT Filed: Jan. 29, 2021

(86) PCT No.: PCT/CN2021/074372
§ 371 (c)(1),
(2) Date: Jul. 8, 2022

(87) PCT Pub. No.: WO2021/151390
PCT Pub. Date: Aug. 5, 2021

(65) Prior Publication Data
US 2023/0042536 A1    Feb. 9, 2023

(30) Foreign Application Priority Data

Jan. 31, 2020  (WO) ................ PCT/CN2020/074100

(51) Int. Cl.
*H04W 72/0446* (2023.01)
(52) U.S. Cl.
CPC ............................... *H04W 72/0446* (2013.01)
(58) Field of Classification Search
CPC ........................... H04W 72/0446; H04L 12/50
(Continued)

(56) References Cited

U.S. PATENT DOCUMENTS

| 10,243,772 B2 | 3/2019 | Subramanian et al. |
| 2018/0242319 A1 | 8/2018 | Akkarakaran et al. |

(Continued)

FOREIGN PATENT DOCUMENTS

| CN | 107306450 A | 10/2017 |
| CN | 110062470 A | 7/2019 |

(Continued)

OTHER PUBLICATIONS

International Search Report and Written Opinion—PCT/CN2021/074372—ISA/EPO—Apr. 20, 2021.

(Continued)

*Primary Examiner* — Dang T Ton
(74) *Attorney, Agent, or Firm* — Holland & Hart LLP

(57) ABSTRACT

Methods, systems, and devices for wireless communications are described. A base station may transmit an indication of a time parameter (e.g., a time delay or a configured duration) associated with determining a configuration for a slot duration. A user equipment (UE) may identify the time parameter and receive an indication of a slot configuration. The UE may determine the configuration of one or more slot durations based on the received indication and according to the time parameter. For instance, the UE may determine the configuration of one or more slots after the time delay. In some other examples, the UE may determine the configuration of one or more slots within the configured duration, and may not use different slot configurations until after the duration expires. The base station and the UE may communicate during the one or more slot durations based on the slot configuration and using the time parameter.

30 Claims, 21 Drawing Sheets

(58) Field of Classification Search
USPC .......................................... 370/329, 400, 403
See application file for complete search history.

(56) References Cited

U.S. PATENT DOCUMENTS

| | | |
|---|---|---|
| 2018/0323925 A1 | 11/2018 | Huang et al. |
| 2019/0159019 A1 | 5/2019 | Yang et al. |
| 2019/0182829 A1 | 6/2019 | Choi et al. |
| 2019/0245648 A1 | 8/2019 | Jo et al. |
| 2019/0306857 A1 | 10/2019 | Lin |
| 2019/0312665 A1 | 10/2019 | Jo et al. |
| 2019/0313383 A1 | 10/2019 | Xiong et al. |
| 2020/0028659 A1 | 1/2020 | Huang et al. |
| 2020/0053767 A1* | 2/2020 | Bai ..................... H04W 72/23 |
| 2020/0154430 A1* | 5/2020 | Gulati .................. H04L 5/0094 |

FOREIGN PATENT DOCUMENTS

| | | |
|---|---|---|
| CN | 110521262 A | 11/2019 |
| CN | 110574330 | 12/2019 |
| EP | 3448111 A1 * | 2/2019 .......... H04L 5/0051 |
| WO | WO-2014161174 A1 | 10/2014 |
| WO | WO-2017181770 A1 | 10/2017 |
| WO | WO-2018187351 A1 | 10/2018 |
| WO | WO-2018204660 | 11/2018 |

OTHER PUBLICATIONS

International Search Report and Written Opinion—PCT/CN2020/074100—ISA/EPO—Oct. 27, 2020.
Mediatek Inc: "Offline Summary #1 of Cross-Slot Scheduling Adaptation," 3GPP TSG RAN WG1 Meeting #99, R1-1913324, Nov. 18-22, 2019, Nov. 19, 2019 (Nov. 19, 2019) sections 1-2, 21 pages.
Supplementary European Search Report—EP21746956—Search Authority—Feb. 9, 2024.

* cited by examiner

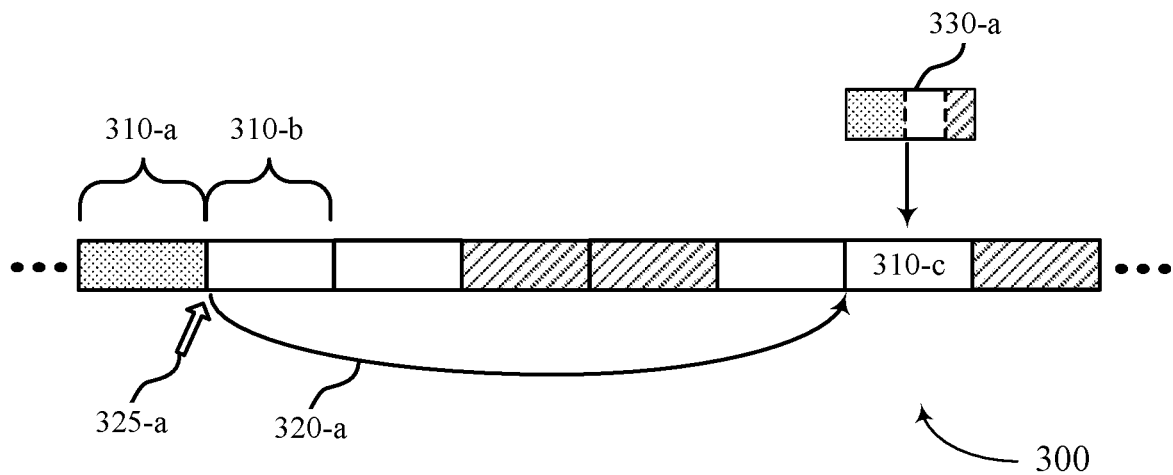
FIG. 3A
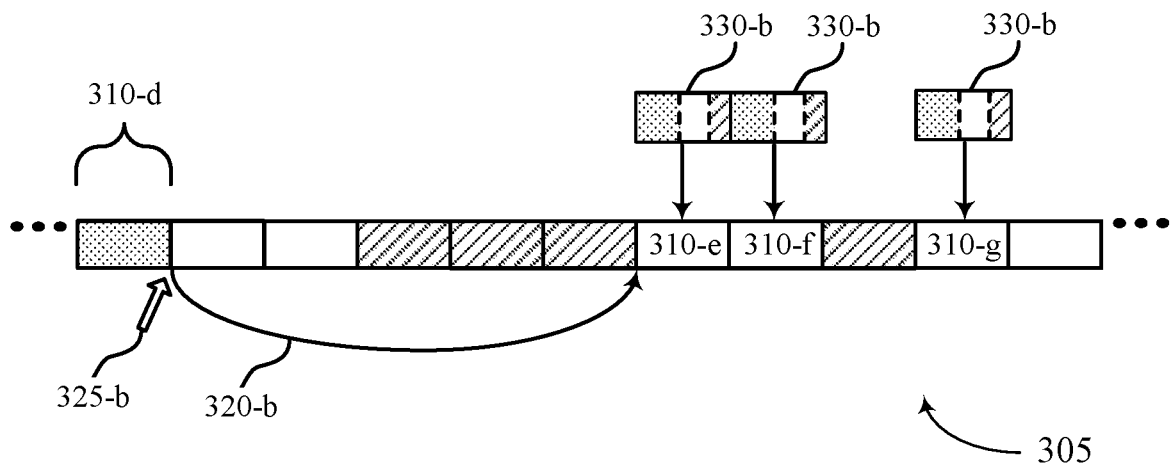
FIG. 3B
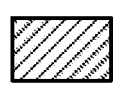 Uplink
 Downlink
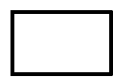 Flexible

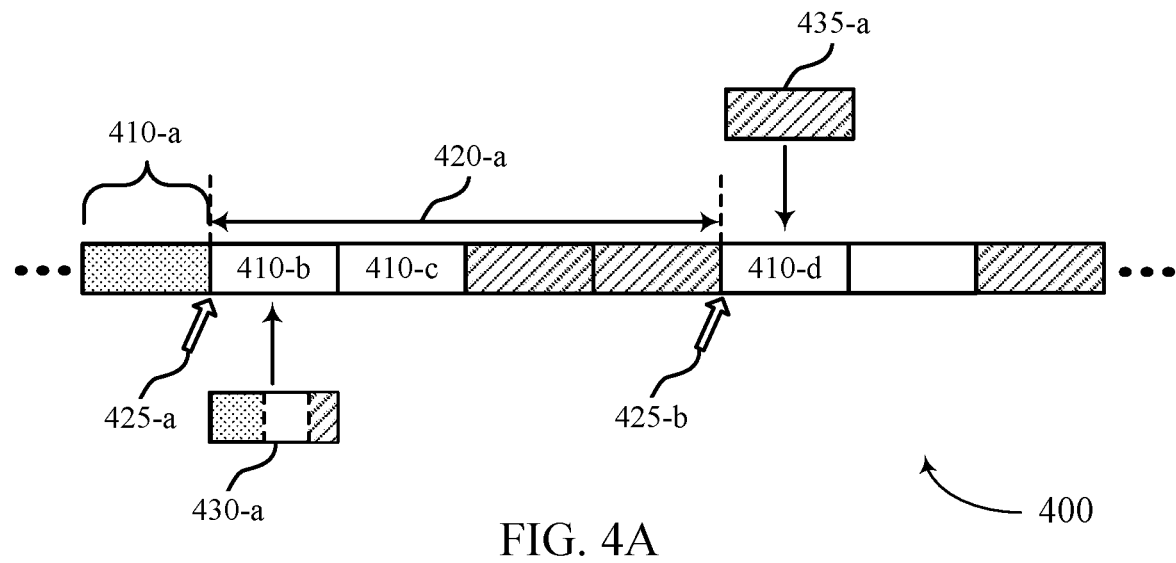
FIG. 4A
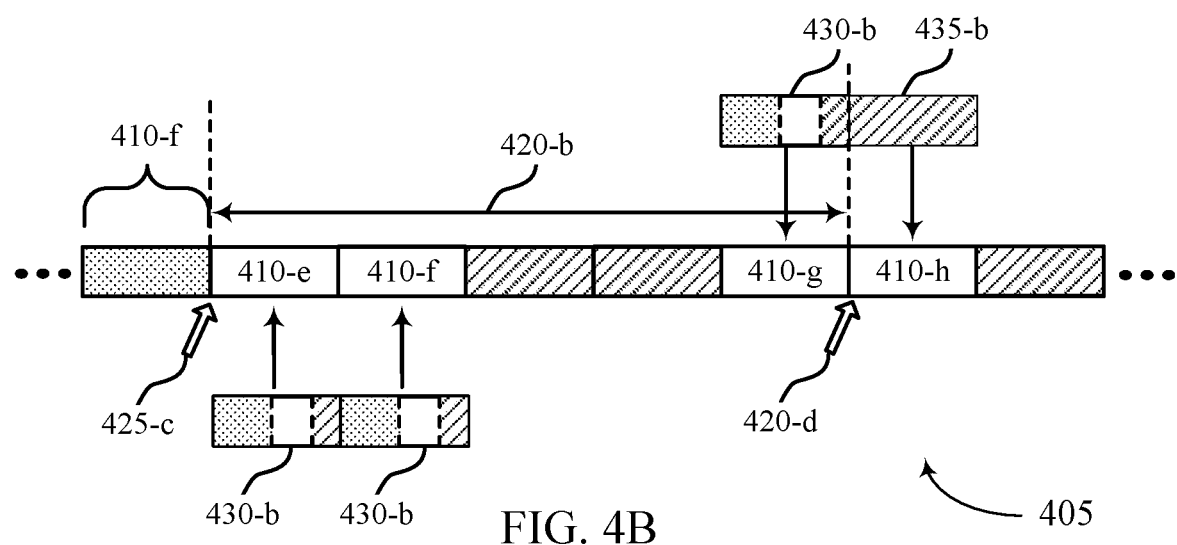
FIG. 4B
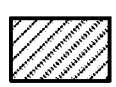 Uplink
 Downlink
 Flexible

TECHNIQUES FOR RELAXING A SLOT FORMAT DETERMINATION

CROSS-REFERENCE

The present Application is a 371 national stage filing of International PCT Application No. PCT/CN/2021/074372 by M A et al. entitled "TECHNIQUES FOR RELAXING A SLOT FORMAT DETERMINATION," filed Jan. 29, 2021; and claims priority to International Patent Application No. PCT/CN2020/074100 by M A et al. entitled "TECHNIQUES FOR RELAXING A SLOT FORMAT DETERMINATION," filed Jan. 31, 2020, each of which is assigned to the assignee hereof, and each of which is expressly incorporated by reference in its entirety herein.

TECHNICAL FIELD

The following relates generally to wireless communications and more specifically to techniques for relaxing a slot format determination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for relaxing a slot format determination. Generally, the described techniques enable a user equipment (UE) to perform a dynamic procedure for determining slot formats, where the UE may determine and apply a configured slot format after a time delay or within a configured duration. For example, a UE may receive a dynamic indication of a time delay or a duration used for updating a slot format configuration for a slot (e.g., a slot including one or more flexible symbol periods). In particular, the UE may receive (e.g., via downlink control information (DCI)) a dynamic indication of a slot format from a base station and may determine a slot format according to the dynamic indication and based on the time delay or the duration. The determination of the slot format may include the UE waiting for the time delay before determining the format of the slot. Additionally or alternatively, the UE may determine the format of one or more slots within the configured duration, where the UE may not monitor for additional indications of a slot format until the duration has expired. The UE may communicate with the base station in accordance with the determined slot format of the slots (e.g., within the duration or after the time delay), which may result in reduced complexity for UE processing and power consumption, among other benefits.

A method of wireless communication at a UE is described. The method may include identifying a time delay associated with determining a configuration associated with a slot duration, receiving an indication of a slot configuration, and determining, after the identified time delay, a configuration of one or more slot durations based on the received indication of the slot configuration.

An apparatus for wireless communication at a UE is described. The apparatus may include at least one processor, memory coupled (e.g., operatively, communicatively, functionally, electronically) to the at least one processor, and instructions stored in the memory. The instructions may be executable by the at least one processor to cause the apparatus to identify a time delay associated with determining a configuration associated with a slot duration, receive an indication of a slot configuration, and determine, after the identified time delay, a configuration of one or more slot durations based on the received indication of the slot configuration.

Another apparatus for wireless communication at a UE is described. The apparatus may include means for identifying a time delay associated with determining a configuration associated with a slot duration, receiving an indication of a slot configuration, and determining, after the identified time delay, a configuration of one or more slot durations based on the received indication of the slot configuration.

A non-transitory computer-readable medium storing code for wireless communication at a UE is described. The code may include instructions executable by a processor to identify a time delay associated with determining a configuration associated with a slot duration, receive an indication of a slot configuration, and determine, after the identified time delay, a configuration of one or more slot durations based on the received indication of the slot configuration.

Some examples of the method, apparatuses, and non-transitory computer-readable medium described herein may further include operations, features, means, or instructions for receiving an indication of a first determination mode that corresponds to determining a configuration of a single slot duration, where determining the configuration of the one or more slot durations includes.

Some examples of the method, apparatuses, and non-transitory computer-readable medium described herein may further include operations, features, means, or instructions for receiving an indication of a second determination mode that corresponds to determining a configuration of multiple slot durations, where determining the configuration of the one or more slot durations includes.

In some examples of the method, apparatuses, and non-transitory computer-readable medium described herein, the repetitions may be applied based on a repetition period, or until an indication of a second slot configuration may be received, or a combination thereof.

Some examples of the method, apparatuses, and non-transitory computer-readable medium described herein may further include operations, features, means, or instructions for identifying a first communication direction of the one or more slot durations, where determining the configuration of the one or more slot durations after the identified time delay may be based on the first communication direction.

Some examples of the method, apparatuses, and non-transitory computer-readable medium described herein may further include operations, features, means, or instructions for identifying a type of a channel scheduled for communication during the one or more slot durations, where determining the configuration of the one or more slot durations after the identified time delay may be based on the type of the channel.

In some examples of the method, apparatuses, and non-transitory computer-readable medium described herein, the type of the channel includes a physical uplink shared channel (PUSCH), a physical downlink shared channel (PDSCH), or a combination thereof.

Some examples of the method, apparatuses, and non-transitory computer-readable medium described herein may further include operations, features, means, or instructions for receiving an indication of a second slot configuration, and determining, upon receipt of the indication of the second slot configuration, a configuration of a portion of a subsequent slot duration.

In some examples of the method, apparatuses, and non-transitory computer-readable medium described herein, the configuration of the portion of the subsequent slot duration includes one or more symbol periods configured for uplink transmissions.

Some examples of the method, apparatuses, and non-transitory computer-readable medium described herein may further include operations, features, means, or instructions for transmitting, to a base station, a capability message that indicates the UE supports the time delay associated with determining the configuration associated with the slot duration, where the time delay may be identified based on the transmitted capability message.

Some examples of the method, apparatuses, and non-transitory computer-readable medium described herein may further include operations, features, means, or instructions for transmitting, to a base station, a message that indicates a type of the UE, where the time delay may be identified based on the type of the UE.

Some examples of the method, apparatuses, and non-transitory computer-readable medium described herein may further include operations, features, means, or instructions for receiving a radio resource control (RRC) message including an indication of the time delay, where the time delay may be identified based on the received RRC message.

Some examples of the method, apparatuses, and non-transitory computer-readable medium described herein may further include operations, features, means, or instructions for receiving DCI including an indication of the time delay, where the time delay may be identified based on the received DCI.

In some examples of the method, apparatuses, and non-transitory computer-readable medium described herein, receiving the indication of the slot configuration may include operations, features, means, or instructions for receiving DCI including a slot format indicator (SFI) including the indication of the slot configuration.

In some examples of the method, apparatuses, and non-transitory computer-readable medium described herein, the DCI includes DCI format 2_0.

In some examples of the method, apparatuses, and non-transitory computer-readable medium described herein, receiving the indication of the slot configuration may include operations, features, means, or instructions for receiving UE-specific signaling that includes the indication of the slot configuration.

In some examples of the method, apparatuses, and non-transitory computer-readable medium described herein, the one or more slot durations include slot durations that each include a set of flexible symbol periods supporting uplink communication, downlink communication, or a combination thereof.

Some examples of the method, apparatuses, and non-transitory computer-readable medium described herein may further include operations, features, means, or instructions for communicating with a base station during the one or more slot durations based on the determined configuration of the one or more slot durations.

A method of wireless communication at a UE is described. The method may include identifying a duration associated with determining a configuration associated with a slot duration, receiving an indication of a slot configuration, and determining, within the identified duration, a configuration of the one or more slot durations based on the received indication of the slot configuration.

An apparatus for wireless communication at a UE is described. The apparatus may include at least one processor, memory coupled (e.g., operatively, communicatively, functionally, electronically) to the at least one processor, and instructions stored in the memory. The instructions may be executable by the at least one processor to cause the apparatus to identify a duration associated with determining a configuration associated with a slot duration, receive an indication of a slot configuration, and determine, within the identified duration, a configuration of the one or more slot durations based on the received indication of the slot configuration.

Another apparatus for wireless communication at a UE is described. The apparatus may include means for identifying a duration associated with determining a configuration associated with a slot duration, receiving an indication of a slot configuration, and determining, within the identified duration, a configuration of the one or more slot durations based on the received indication of the slot configuration.

A non-transitory computer-readable medium storing code for wireless communication at a UE is described. The code may include instructions executable by a processor to identify a duration associated with determining a configuration associated with a slot duration, receive an indication of a slot configuration, and determine, within the identified duration, a configuration of the one or more slot durations based on the received indication of the slot configuration.

Some examples of the method, apparatuses, and non-transitory computer-readable medium described herein may further include operations, features, means, or instructions for refraining from monitoring for additional indications of slot configurations within the identified duration, where the refraining may be based on determining the configuration of the one or more slot durations.

Some examples of the method, apparatuses, and non-transitory computer-readable medium described herein may further include operations, features, means, or instructions for resuming monitoring for the additional indications of the slot configuration upon expiration of the identified duration.

Some examples of the method, apparatuses, and non-transitory computer-readable medium described herein may further include operations, features, means, or instructions for receiving an indication of a first determination mode that corresponds to determining a configuration of a single slot duration, where determining the configuration of the one or more slot durations includes.

Some examples of the method, apparatuses, and non-transitory computer-readable medium described herein may further include operations, features, means, or instructions for receiving an indication of a second determination mode that corresponds to determining a configuration of multiple slot durations, where determining the configuration of the one or more slot durations includes.

Some examples of the method, apparatuses, and non-transitory computer-readable medium described herein may further include operations, features, means, or instructions for identifying a first communication direction of the one or more slot durations, where determining the configuration of the one or more slot durations within the identified duration may be based on the first communication direction.

Some examples of the method, apparatuses, and non-transitory computer-readable medium described herein may further include operations, features, means, or instructions for identifying a type of a channel scheduled for communication during the one or more slot durations, where determining the configuration of the one or more slot durations within the identified duration may be based on the type of the channel.

In some examples of the method, apparatuses, and non-transitory computer-readable medium described herein, the type of the channel includes a PUSCH, a PDSCH, or a combination thereof.

Some examples of the method, apparatuses, and non-transitory computer-readable medium described herein may further include operations, features, means, or instructions for determining, upon receipt of the indication of the slot configuration, a configuration of a portion of a slot duration of the one or more slot durations within the identified duration.

In some examples of the method, apparatuses, and non-transitory computer-readable medium described herein, the configuration of the portion of the slot duration includes one or more symbol periods configured for uplink transmissions.

Some examples of the method, apparatuses, and non-transitory computer-readable medium described herein may further include operations, features, means, or instructions for transmitting, to a base station, a capability message that indicates the UE supports the duration associated with determining the configuration associated with the slot duration, where identifying the duration may be based on the capability message.

Some examples of the method, apparatuses, and non-transitory computer-readable medium described herein may further include operations, features, means, or instructions for transmitting, to a base station, a message that indicates a type of the UE, where identifying the duration may be based on the type of the UE.

Some examples of the method, apparatuses, and non-transitory computer-readable medium described herein may further include operations, features, means, or instructions for receiving an RRC message including an indication of the duration, where the duration may be identified based on the received RRC message.

Some examples of the method, apparatuses, and non-transitory computer-readable medium described herein may further include operations, features, means, or instructions for receiving DCI including an indication of the duration, where the duration may be identified based on the received DCI.

In some examples of the method, apparatuses, and non-transitory computer-readable medium described herein, receiving the indication of the slot configuration may include operations, features, means, or instructions for receiving DCI including an SFI, where the SFI includes the indication of the slot configuration.

In some examples of the method, apparatuses, and non-transitory computer-readable medium described herein, the DCI includes DCI format 2_0.

In some examples of the method, apparatuses, and non-transitory computer-readable medium described herein, receiving the indication of the slot configuration may include operations, features, means, or instructions for receiving UE-specific signaling that includes the indication of the slot configuration.

In some examples of the method, apparatuses, and non-transitory computer-readable medium described herein, the one or more slot durations include slot durations that each include a set of flexible symbol periods supporting uplink communication, downlink communication, or a combination thereof.

Some examples of the method, apparatuses, and non-transitory computer-readable medium described herein may further include operations, features, means, or instructions for communicating with a base station during the one or more slot durations based on the determined configuration of the one or more slot durations.

A method of wireless communication at a base station is described. The method may include transmitting, to a UE, an indication of a time parameter associated with determining a configuration associated with a slot duration, transmitting an indication of a slot configuration, and communicating with the UE during the one or more slot durations based on a determination of a configuration of one or more slot durations using the time parameter.

An apparatus for wireless communication at a base station is described. The apparatus may include at least one processor, memory coupled (e.g., operatively, communicatively, functionally, electronically) to the at least one processor, and instructions stored in the memory. The instructions may be executable by the at least one processor to cause the apparatus to transmit, to a UE, an indication of a time parameter associated with determining a configuration associated with a slot duration, transmit an indication of a slot configuration, and communicate with the UE during the one or more slot durations based on a determination of a configuration of one or more slot durations using the time parameter.

Another apparatus for wireless communication at a base station is described. The apparatus may include means for transmitting, to a UE, an indication of a time parameter associated with determining a configuration associated with a slot duration, transmitting an indication of a slot configuration, and communicating with the UE during the one or more slot durations based on a determination of a configuration of one or more slot durations using the time parameter.

A non-transitory computer-readable medium storing code for wireless communication at a base station is described. The code may include instructions executable by a processor to transmit, to a UE, an indication of a time parameter associated with determining a configuration associated with a slot duration, transmit an indication of a slot configuration, and communicate with the UE during the one or more slot durations based on a determination of a configuration of one or more slot durations using the time parameter.

Some examples of the method, apparatuses, and non-transitory computer-readable medium described herein may further include operations, features, means, or instructions for receiving, from the UE, a capability message that indicates the UE supports the time parameter for determining the configuration associated with the slot duration, where transmitting the indication of the time parameter may be based on the received capability message.

Some examples of the method, apparatuses, and non-transitory computer-readable medium described herein may further include operations, features, means, or instructions for receiving, from the UE, a message that indicates a type of the UE, where transmitting the indication of the time parameter may be based on the type of the UE.

Some examples of the method, apparatuses, and non-transitory computer-readable medium described herein may further include operations, features, means, or instructions for identifying an operational mode of the UE, where transmitting the indication of the time parameter may be based on the operational mode of the UE.

Some examples of the method, apparatuses, and non-transitory computer-readable medium described herein may further include operations, features, means, or instructions for transmitting an indication of a first determination mode that corresponds to determining a configuration of a single slot duration based on the time parameter.

Some examples of the method, apparatuses, and non-transitory computer-readable medium described herein may further include operations, features, means, or instructions for transmitting an indication of a second determination mode that corresponds to determining a configuration of multiple slot durations based on the time parameter.

In some examples of the method, apparatuses, and non-transitory computer-readable medium described herein, the time parameter includes a time delay associated with determining a configuration associated with a slot duration, or a duration associated with determining a configuration of a slot duration, or a combination thereof.

BRIEF DESCRIPTION OF THE DRAWINGS

FIGS. 3A and 3B illustrate examples of slot diagrams that support techniques for relaxing a slot format determination in accordance with aspects of the present disclosure.

FIGS. 4A and 4B illustrate examples of slot diagrams that support techniques for relaxing a slot format determination in accordance with aspects of the present disclosure.

DETAILED DESCRIPTION

Figure 1:
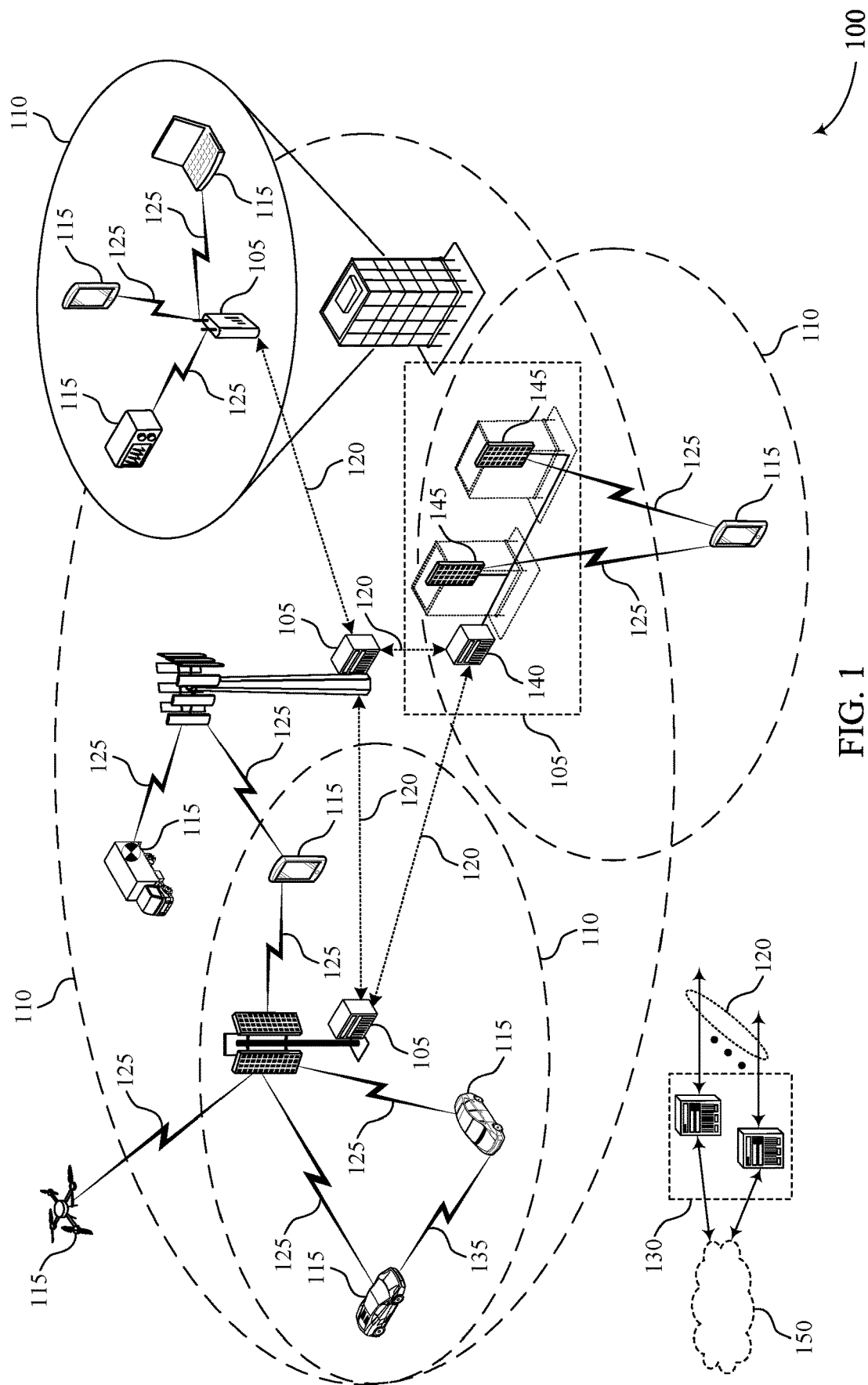
FIGS. 1 and 2 illustrate examples of wireless communications systems that support techniques for relaxing a slot format determination in accordance with aspects of the present disclosure.

In some wireless communication systems, a base station may indicate a slot configuration to a user equipment (UE). The slot configuration may be indicated via radio resource control (RRC) signaling (e.g., cell-specific RRC signaling, UE-specific RRC signaling), or may be indicated via a slot format indicator (SFI) included in downlink control information (DCI), or both. These indications may provide a slot format for each slot of a number of slots used for communications with a base station, where each slot may be used for uplink (e.g., having a number of symbol periods configured for uplink transmissions), downlink (e.g., having a number of symbol periods configured for downlink reception), or may be flexible (e.g., having one or more symbol periods that may be configured for either uplink or downlink).

In some cases, the UE may determine an updated slot format for the flexible slots based on the RRC signaling, the DCI indication, or a combination thereof. When determining the slot format, the UE may override flexible symbols in the flexible slots provided by a previously-received slot format configuration. As an example, the UE may identify an RRC-configured flexible slot format (e.g., configured either through cell-specific or UE-specific RRC signaling) and then use a dynamically-indicated SFI to jointly determine the slot format for the flexible slot. However, the procedure for dynamically determining the slot format (e.g., based on a received SFI within DCI) may be complex, and may be difficult for the UE to implement due to increased processing at the UE (e.g., due to dynamically switching radio frequency (RF) components between uplink and downlink or vice versa). Specifically, the UE may determine and apply an indicated slot format immediately upon receipt of the slot format indication, which may result in latency in the system as well as increased power consumption while the UE processes the slot format configuration. Further, the UE may continually monitor for one or more different slot format configurations that are provided over different types of signaling. Thus, the procedure for determining a slot format from a received indication may result in relatively high UE processing complexity (e.g., due to how quickly the slot format may be determined by the UE), which may cause delays, inefficient communications, and increased power consumption. The complexity of determining the slot format may be especially pronounced in cases where the UE is a low-complexity or low-power UE (e.g., having limited processing capabilities). As such, it may be desirable to utilize techniques that relax the process of determining a slot format by a UE.

Accordingly, the techniques described herein may enable a UE to perform a dynamic determination of slot formats using a relaxed slot format determination procedure, which may allow a UE to reduce complexity related to flexible slot format determination, thereby improving power consumption and latency in the system by easing the processing burden on the UE. Aspects of the present disclosure provide for the UE to use a time parameter when determining a slot format configuration for one or more flexible slots when a dynamic indication is received (e.g., in DCI). In some cases, the UE may wait an amount of time before determining and applying a slot format configuration to a slot. For example, the UE may determine a time delay based on a configured determination timeline (e.g., indicated in DCI, or UE-specific RRC signaling). When the UE receives a dynamic indication of a slot format configuration, the UE may wait to begin configuring slots according to the dynamic indication until after the configured timeline (e.g., time delay). The time delay may be specified in an indication to the UE to determine the slot format (e.g., a received DCI that includes an SFI), in an indication received in RRC signaling, may be a predetermined value, or may be determined by the UE. In some cases, the UE may determine the slot format for a single slot that occurs after the timeline. In some other cases, the UE may repeat the determined slot format in additional slots until a subsequent indication is received or for a designated repetition period. The time delay may enable a UE to wait an amount of time before applying a slot format configuration to a slot (e.g., a flexible slot), decreasing the processing complexity at the UE due to an increased timeframe (e.g., as compared to immediately applying the slot format configuration to a slot occurring after the dynamic indication is received).

Additionally or alternatively, the UE may determine the slot format for a configured duration after the dynamic indication is received. For example, the UE may determine the slot format for a number of different slots that occur within the configured duration. The UE may receive an indication of a slot format that may be applied to an upcoming symbol (e.g., an indication carried by DCI format 2_0, an indication in UE-specific RRC signaling, or both) and then identify the duration associated with the procedure for determining the slot format. The duration may begin upon receipt of the dynamic indication of the slot format configuration, and the UE may apply the slot format configuration to one or more slots that occur within the duration. In some examples, the UE may apply the configuration to a threshold number of slots (e.g., one or two slots) within the duration (e.g., based on the indication, predetermined values, or characteristics of the UE). In some other examples, the UE may apply the slot format configuration to a slot within the duration, and then repeat the same configuration in other slots (e.g., flexible slots) until the duration expires, until another dynamic indication is received, for a configured or predetermined number of repetitions, or any combination thereof. In some aspects, the UE may refrain from monitoring for additional, dynamic indications of slot format configurations (e.g., sent in DCI) over the configured duration, which may relax processing at the UE (e.g., reduce processing volume).

In some examples, the UE may selectively determine the format of one or more slots using the time delay or the duration described herein, which may be based on a communication direction or a type of signaling, or both. For example, the UE may receive an indication of a downlink configured slot format and may wait to apply the downlink configuration to a flexible slot until after the time delay, whereas uplink configured slot formats may be applied to a flexible slot immediately upon receipt of the corresponding indication. In some other examples, the use of the time delay or duration may be based on a channel type or priority of signaling to be used when updating a slot format. Additionally or alternatively, the UE may update a portion of a flexible slot upon receiving an indication of a slot format configuration, for example, where the temporally last symbols of the flexible slot may be updated to have an uplink format (which may to allow the UE time to switch between downlink and uplink). In some cases, the UE may report, to a base station, which techniques for determining the slot format are supported according to an explicit report, a UE type, UE mode, or a combination thereof.

Aspects of the disclosure are initially described in the context of wireless communications systems. Additional aspects of the disclosure are described with reference to slot diagrams and process flows. Aspects of the disclosure are further illustrated by and described with reference to apparatus diagrams, system diagrams, and flowcharts that relate to techniques for relaxing a slot format determination.

FIG. 1 illustrates an example of a wireless communications system 100 that supports techniques for relaxing a slot format determination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. In some examples, wireless communications system 100 may support the relaxation of slot format determination procedures, which may provide for efficient communications through enhanced reliability and decreased processing complexity.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, a video device), a camera, a gaming device, a navigation/positioning device (e.g., global navigation satellite system (GNSS) devices based on, for example, global positioning system (GPS), Beidou, GLONASS, or Galileo, a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some examples, a UE 115 may be an example of a lowpower device, a low-tier device, or may be an example of a device supporting limited functionality. For instance, a UE 115 may have a small form-factor design, may be configured with limited processing power (e.g., based on the components of the UE 115), or both. Such a UE 115 may therefore benefit from operations and processed having reduced complexity. In some other cases, UEs 115 that do not have limits on, for example, functionality and processing abilities, may benefit from less-complex processed though power savings and increased communications reliability. In any case, the described techniques may provide one or more advantages for various types of UEs 115.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include a symbol period (e.g., a duration of one modulation symbol) and a subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of an RF spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs 115. MTC or IoT UEs 115 may include MTC/enhanced MTC (eMTC, also referred to as category (Cat)-M, Cat M1) UEs 115, NB-IoT (also referred to as CAT NB1) UEs 115, as well as other types of UEs 115. eMTC and NB-IoT may refer to future technologies that may evolve from or may be based on these technologies. For example, eMTC may include FeMTC (further eMTC), eFeMTC (enhanced further eMTC), or mMTC (massive MTC), and NB-IoT may include eNB-IoT (enhanced NB-IoT), or FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In some other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other cases, the device may provide HARQ feedback in a subsequent slot, or according to some other time interval.

Wireless communications system 100 may support the use of slot determination procedures having relaxed timeframes. For example, a base station 105 may transmit an indication of a time parameter associated with determining a configuration for a slot duration. The time parameter may be a time delay or a configured duration, where a UE 115 may apply either the time delay or the duration to a slot determination process. In particular, the UE 115 may identify the time parameter, then receive an indication of a slot configuration (e.g., a dynamic or semi-static indication of a slot format configuration) from the base station 105. The UE 115 may determine the configuration or format of one or more slot durations based on the received indication and according to the time parameter. In one example, the UE 115 may wait for a period of time equal to the time delay before applying the received slot configuration to a subsequent slot, which may introduce a delay between the time the slot configuration was received and when the UE 115 applies the indicated slot configuration, thereby easing the processing time for the slot format determination (e.g., as compared to the UE 115 determining or applying the slot configuration immediately upon receipt of the indication). In another example, the UE 115 may apply the slot format configuration within the configured duration, where the UE 115 may refrain from monitoring for other indications of a slot format configuration during the configured duration. Here, the duration may enable the UE 115 to determine the slot format upon receipt of the indicated slot format, but may also relax the monitoring and processing performed by the UE 115 (e.g., as compared to continually monitoring for a slot format configuration). In some examples, the slot format configuration may be applied to one slot, or may be repeated across multiple slots. The base station 105 and the UE 115 may then communicate during the one or more slot durations based on the slot configuration and using the time parameter.

Figure 2:
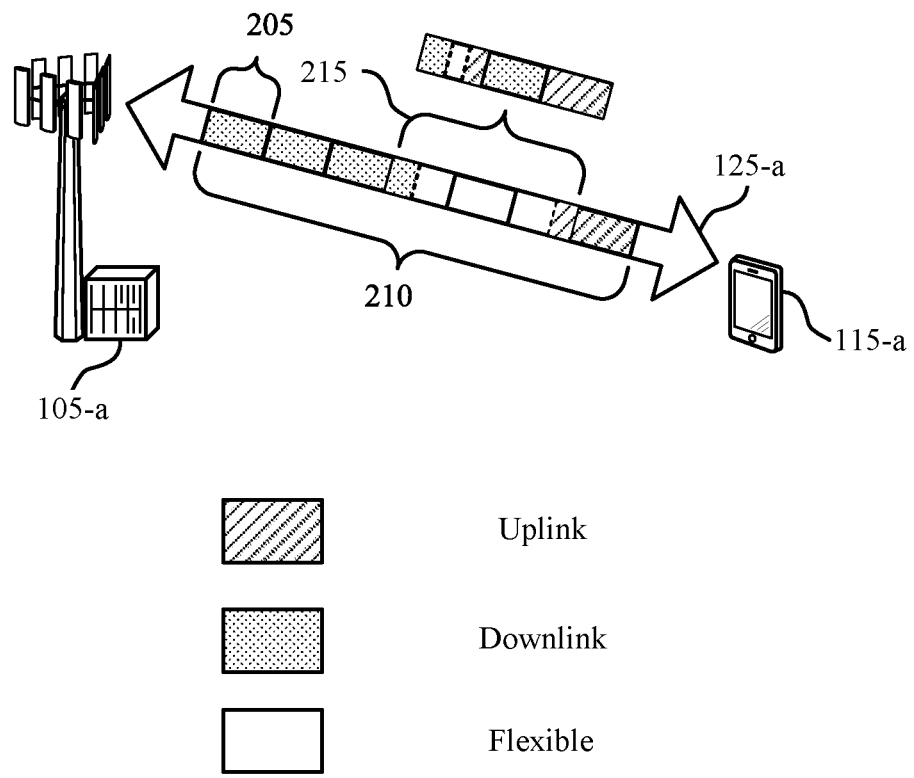

FIG. 2 illustrates an example of a wireless communications system 200 that supports techniques for relaxing a slot format determination in accordance with aspects of the present disclosure. In some examples, wireless communications system 200 may implement aspects of wireless communications system 100 and may include UE 115-a and base station 105-a, which may be examples of a UE 115 and base station 105 described with reference to FIG. 1. As described herein, UE 115-a and base station 105-a may transmit and receive control information and data over symbols in a slot 205 (e.g., a slot duration) via communication link 125-a, which may be based on the symbol number in the slot 205 and a format of the slot 205. UE 115-a and base station 105-a may transmit and receive data over a number of symbols in one or more slots 205 during a communication duration 210. Each slot 205 may have a slot format and a slot duration. In some cases, the slot format may determine the transmission direction for each of one or more symbols within a slot 205, which may include uplink symbols, downlink symbols, and flexible symbols that may be flexibly and dynamically configured for either uplink or downlink communications.

In some cases, a network (e.g., base station 105-a) may select a slot format, or slot configuration, from a number of slot formats (e.g., 61 slot formats), and indicate the selection to UE 115-a. Base station 105-a and UE 115-a may use each slot 205 for uplink communication or downlink communication. Thus, each slot 205 may be an uplink slot 205, downlink slot 205, or may remain flexible (e.g., may be used to transmit either uplink or downlink symbols). In some cases, the indication of the slot configuration may include a combination of RRC parameters and a DCI format (e.g., DCI format 2_0). For example, UE 115-a may receive an RRC configuration, a DCI indication, or both, from base station 105-a for each slot 205. UE 115-a may then determine the slot configuration (e.g., uplink or downlink direction or whether the slot 205 is flexible) from the RRC configuration, DCI indication, or both.

In some examples, the RRC configuration may include several RRC parameters, which may correspond to a cell-specific slot format configuration or a UE-specific slot format configuration. For example, a cell-specific RRC slot format configuration (e.g., tdd-UL-DL-ConfigurationCommon) may provide a slot format for each slot 205 over a number of slots 205 (e.g., slots 205 during communication duration 210). The configuration may provide one or more patterns for the slots 205, each with a number of parameters including, but not limited to, a periodicity of an uplink-downlink pattern (e.g., dl-Ul-TransmissionPeriodicity), a number of consecutive full downlink slots 205 at the beginning of each downlink-uplink pattern (e.g., nrofDownlinkSlots), a number of consecutive downlink symbols in the beginning of a slot 205 following the last full downlink slot 205 (e.g., nrofDownlinkSymbols), a number of consecutive full uplink slots 205 at the end of each uplink-downlink pattern (e.g., nrofUplinkSlots), and a number of consecutive uplink symbols at the end of a slot 205 preceding the first full uplink slot 205 (e.g., nrofUplinkSymbols). In some cases, unspecified slots 205 and symbols after the last downlink symbol and before the first uplink symbol may be designated as flexible slots 205 and symbols.

In some other examples, the RRC configuration may include a UE-specific slot format configuration (e.g., tdd-UL-DL-ConfigurationDedicated), and UE 115-a may use the configuration to override flexible symbols in a slot 205. For example, UE 115-a may receive a UE-specific RRC slot format configuration, which may include additional information regarding the slots 205 provided by an RRC slot format configuration. In some cases, the UE-specific slot format configuration may include a set of slot configurations for a set of slots 215 (e.g., slot configurations that may include one or more flexible symbols such as those corresponding to the set of slots 215) and associated slot indices. UE 115-a may override the cell-specific slot format configuration for the slots 205 corresponding to the associated slot indices. For example, UE 115-a may override the flexible symbols in the set of slots 215 to be either uplink or downlink symbols according to the UE-specific slot format configuration.

Additionally, a UE 115 may determine the slot format, or slot configuration, based on a DCI indication. For example, UE 115-a may receive an SFI included within DCI (e.g., DCI format 2_0) from base station 105-a. In some cases, the SFI within the DCI may be scrambled by an SFI-radio network temporary identifier (SFI-RNTI). The DCI may indicate a slot format for each slot 205 in a communication duration 210. In some cases, the slot format indication may begin with the slot 205 where the UE 115 detects the DCI. For example, UE 115-a may use the RRC configured slot format (e.g., cell-specific and UE-specific RRC configured slot format) for a slot 205 and the SFI for the slot 205 to jointly determine the slot format. In some cases, UE 115-a may support the RRC configured slot format configuration and may choose to support the SFI included within DCI, which may be signaled through a capability report for UE 115-a. In some cases, the process by which UE 115-a may determine the slot format based on a received SFI within DCI may be referred to as a dynamic determination of a slot format. That is, a dynamic determination (or a dynamic determination process) may correspond to UE 115-a determining a slot format for a flexible slot 205 (which may have been previously configured, for example, through RRC signaling) based on a received dynamic indication of the slot format (e.g., in DCI).

In some cases, the dynamic determination of a slot format may be a complicated procedure for UE 115-a to implement. For instance, it may be difficult for UE 115-a to dynamically switch an RF chain between uplink and downlink for different slots 205 or symbols within slots 205. For example, UE 115-a may receive an SFI within DCI that dynamically indicates the slot format, and UE 115-a may be expected to apply the indicated slot format without delay (e.g., to a flexible slot that immediately follows receipt of the DCI). In some other examples, UE 115-a may receive dynamic scheduling information for uplink and downlink data and signals. The dynamic scheduling information may allow UE 115-a to override the RRC-configured slot format. In such cases, dynamic determination of a slot format may depend on UE 115-a being prepared to dynamically determine the communication direction and conduct the communication (e.g., reception or transmission of data and signals in a slot).

For example, UE 115-a may use dynamic scheduling after receiving DCI to specify an uplink or downlink communication in flexible symbols (e.g., for the set of slots 215). Additionally, UE 115-a may use dynamic scheduling after receiving DCI for downlink reception or uplink transmission to cancel higher-layer configured uplink transmissions or downlink receptions. In some cases, the higher-layer configured uplink transmissions or downlink receptions may be in flexible symbols indicated by an SFI in DCI. In such cases, the dynamic overriding or cancelation operation may result in relatively high processing complexity for a UE 115. Thus, it may be beneficial to relax the dynamic slot format determination procedure for the UE 115.

As described herein, wireless communications system 200 may support the use of techniques that relax the dynamic determination of slot formats. More specifically, the described techniques may enable UE 115-a to perform a dynamic determination of slot formats using a relaxed dynamic determination procedure, which may allow UE 115-a to reduce complexity related to the slot format determination, thereby improving power consumption and latency in the system by easing the processing burden on UE 115-a. In some cases, UE 115-a may use a time parameter when determining a slot format configuration for one or more flexible slots 205 when a dynamic indication is received (e.g., in DCI). In some cases, UE 115-a may wait an amount of time before determining and applying a slot format configuration to a slot 205. For example, UE 115-a may determine a time delay based on a configured determination timeline (e.g., indicated in DCI, in UE-specific RRC signaling (such as included in the parameter Tdd-UL-DL_ConfigurationDedicated) or other signaling). When UE 115-a receives DCI indicating a slot format configuration, UE 115-a may wait to begin configuring one or more slots 205 according to the dynamic indication until after the configured timeline (e.g., time delay). The time delay may be specified in an indication to UE 115-a to determine the slot format (e.g., a received DCI that includes an SFI), in an indication received in RRC signaling, may be a predetermined value, or may be determined by UE 115-a. In some cases, UE 115-a may determine the slot format for a single slot 205 that occurs after the timeline. In some other cases, UE 115-a may repeat the determined slot format in one or more additional slots 205 until a subsequent indication is received or for a designated repetition period. Here, the determination of the slot format for one or multiple slots 205 may be based on respective modes, which may be indicated to UE 115-a by base station 105-a (e.g., in RRC signaling, in DCI) The time delay may enable UE 115-a to wait an amount of time before applying a slot format configuration to a slot 205 (e.g., a flexible slot 205), which may decrease the processing complexity at UE 115-a due to an increased timeframe (e.g., as compared to immediately applying the slot format configuration to a slot 205 after a DCI message is received).

Additionally or alternatively, UE 115-a may determine the slot format for a configured duration after a DCI message is received. For example, UE 115-a may determine the slot format for a number of different slots 205 that occur within the configured duration. UE 115-a may receive an indication of a slot format that may be applied to an upcoming slot 205 (e.g., an indication carried by DCI format 2_0, an indication in UE-specific RRC signaling, or both) and then identify the configured duration associated with the procedure for determining the slot format. The duration may begin upon receipt of the DCI indicating the slot format configuration, and UE 115-a may apply the slot format configuration to one or more slots 205 that occur within the duration. In one example, UE 115-a may apply the configuration to a single slot 205 within the duration (e.g., based on the indication, predetermined values, or characteristics of UE 115-a). In some other examples, UE 115-a may apply the slot format configuration to a first slot 205 within the duration, and then may repeat the same configuration in other slots 205 (e.g., other flexible slots 205 that occur within the configured duration) until the duration expires, until another DCI is received, for a configured or predetermined number of repetitions, or any combination thereof. In some cases, UE 115-a may refrain from monitoring for additional DCI indicating slot format configurations while the configured duration is in effect, which may relax processing at UE 115-a.

In some examples, UE 115-a may selectively determine the format of one or more symbols of slots 205 using the time delay or the duration, which may be based on a communication direction, a type of signaling, a priority of signals, or other parameters. For example, UE 115-a may receive a DCI message including an indication of a downlink configured slot format and may wait to apply the downlink configuration to a flexible slot 205 until after the time delay, whereas uplink configured slot formats may be applied to a flexible slot 205 immediately upon receipt of the corresponding DCI. In such cases, the use of the delay (or the duration) may be based on the communication direction of the slot format. In some other examples, the use of the time delay or duration may be based on a channel type or priority of signaling to be used when updating a slot format. Additionally or alternatively, UE 115-a may update a portion of a flexible slot 205 upon receiving DCI, for example, where temporally last symbol periods of a flexible slot 205 may be updated to have an uplink format (which may to allow UE 115-a time to switch between downlink and uplink). In some cases, UE 115-a may transmit a report to base station 105-a including techniques for determining the slot format supported according to an explicit report, a UE type, UE mode, or a combination thereof. In such cases, base station 105-a may identify how UE 115-a may determine the slot format, which may be based on the indicated capabilities of UE 115-a, based on a known operational mode of UE 115-a, or based on explicit signaling from UE 115-a.

UE 115-a may determine to implement a partial dynamic determination, where some types of slot formats may be applied upon receipt, and other types of slot formats may be applied based on the time delay or duration. In some cases, UE 115-a may perform dynamic determination according to a transmission type. For example, uplink slot formats may be triggered by the dynamic determination for application without delay, which may improve downlink reception complexity at UE 115-a. More specifically, dynamically indicated slot formats that correspond to a downlink slot format for a flexible slot 205 may be applied based on the time duration or delay. Slot formats that correspond to an uplink slot format for a flexible slot 205 may be applied upon receipt of the dynamic indication. Because there may be a greater number of downlink slot formats dynamically configured for UE 115-a, the use of the time delay or duration for downlink may ease the complexity of the dynamic determination procedure while allowing for uplink transmissions to be configured in a subsequent slot 205 without delay, thereby reducing complexity while reducing latency. Similar procedures may be implemented where downlink slot formats are applied upon receipt and uplink slot formats are applied after the delay or within the configured duration.

In some cases, UE 115-a may perform dynamic determination procedures based on the time delay or duration, a channel type, a signal scheduled for transmission, or a combination thereof. For example, in instances when reference signals (e.g., used for measurements) are scheduled for transmission or reception during a slot 205, the corresponding slot format enabling the communication of such reference signals may be immediately applied or updated when a dynamic indication is received. However, for slots 205, symbols, or both, in which data of a physical downlink shared channel (PDSCH), physical uplink shared channel (PUSCH) or downlink data channels is communicated, UE 115-a may use the time delay or duration. In this way, data transmissions having a relatively higher priority (e.g., information transmitted via PDSCH and PUSCH) may be communicated during slots that have been configured using a relaxed timeframe, which may enhance the reliability of these channels. In some other cases, based on a type of data to be communicated during a slot 205, UE 115-a may implement the time delay or durations based on the data type.

In some cases, UE 115-a may perform the dynamic determination procedure for a portion of the flexible symbols within a slot 205, where different slot formats may be applied the symbols based on the dynamic indication (e.g., received in DCI). As an example, UE 115-a may apply an updated slot format to a portion of symbols within a slot upon receiving a dynamic indication of the slot format. Here, the slot format may indicate an uplink configuration for the portion of symbols, and the symbols may be the last one or more flexible symbols in a flexible slot (e.g., a slot that follows the receipt of the dynamic indication). The unused portions of the slot (e.g., the symbols preceding the last flexible symbols) that are not configured may account for a delay that may result from dynamically switching RF chains between uplink and downlink, thus leaving enough time for UE 115-a to decode corresponding DCI and switch a transceiver from downlink to uplink.

In some cases, UE 115-a may report to base station 105-a which methods for dynamic determination UE 115-a supports. For example, UE 115-a may report which techniques UE 115-a supports for the dynamic determination procedure (e.g., using the time delay, using the duration, or both) via uplink signaling (e.g., a UE capability report) to base station 105-a. In some cases, UE 115-a may report its UE type (e.g., a reduced complexity UE type), and base station 105-a may determine which slot format determination techniques UE 115-a supports based on the reported UE type. In some other cases, UE 115-a may operate in some UE mode (e.g., a low-power mode, a low-tier mode, or other mode), and the corresponding dynamic determination techniques may be based on the UE mode of UE 115-a, which may be determined by base station 105-a.

FIG. 3A and 3B illustrate examples of slot diagrams 300 and 305 that support techniques for relaxing a slot format determination in accordance with aspects of the present disclosure. In some examples, slot diagrams 300 and 305 may implement aspects of wireless communications systems 100, wireless communications system 200, or both. For instance, slot diagrams 300 and 305 may each illustrate a timeframe in which a UE 115 updates or applies an indicated slot format to a one or more symbols in a flexible slot based on a configured delay. Slot diagrams 300 and 305 include slots 310, which may be respective examples of slots 205 as described with reference to FIG. 2.

In some cases, a UE 115 may identify a time delay (e.g., a determination timeline 320) based on an indication from a base station 105, a predetermined value, or a UE configuration. The indication of the determination timeline 320 may be received in RRC signaling, in a DCI message, or a combination thereof. The determination timeline 320 may include a number of slots 310. For example, as shown in FIG. 3A and 3B, configured determination timeline 320-*a* and determination timeline 320-*b* may include five slots 310. Although five slots 310 are used for the described examples of the determination timelines 320, any number of slots 310 or other durations (e.g., in units of time) may be used for the determination timelines 320.

The UE 115 may receive a dynamic slot configuration indication (e.g., an indication of dynamic determination 325 sent in DCI) from a base station 105. For example, as illustrated in FIG. 3A, slot 310-*a* may be a last downlink slot 310 according to an indicated RRC cell-specific slot format configuration, and the UE 115 may receive indication of dynamic determination 325-*a* during downlink slot 310-*a*. The indication of dynamic determination 325-*a* may include an RRC configuration, a DCI indication (e.g., an SFI including in DCI format 2_0), or both. The last downlink symbol in downlink slot 310-*a* may be followed by one or more flexible slots 310, uplink slots 310, or both. For example, flexible slot 310-*b* may immediately follow downlink slot 310-*a*. However, instead of applying the indicated slot format (e.g., received via the indication of dynamic determination 325-*a*) to flexible slot 310-*b*, the UE 115 may wait until after the determination timeline 320 (e.g., a time delay) before applying the indicated slot format to a flexible slot 310. In particular, after waiting the determination timeline 320-*a*, the UE 115 may apply an updated slot format 330-*a* to flexible slot 310-*c*, where updated slot format 330-*a* may update the configuration of the previously-configured flexible symbols of the slot 310-*c* to one or more uplink symbols, downlink symbols, flexible symbols, or a combination thereof, in accordance with the dynamic determination procedure.

Similarly, as illustrated in FIG. 3B, the UE 115 may receive an indication of dynamic determination 325-*b* in one or more symbols of downlink slot 310-*d*, then wait for the configured timeline 320-*b* (i.e., UE 115 may wait for a time delay to pass) before implementing the dynamic determination procedure and applying an updated slot format 330-*b* to slot 310-*e*. Here, even though the UE 115 received indication of dynamic determination 325-*a* and dynamic determination 325-*b* during or after downlink slot 310-*a* and downlink slot 310-*d*, respectively, the UE 115 may not perform the dynamic determination procedure until after the determination timeline 320-*a* and the determination timeline 320-*b* (e.g., updating slot 310-*a* and updating slot 310-*c*). Thus, upon receipt of the indication of the dynamic determination 325, the UE 115 may wait for a number of slots 310 (e.g., five slots 310) or a duration of time (e.g., using a clock or timer) specified by the configured determination timeline 320, which may relax a timeframe for applying an updated slot format 330 to flexible symbols of a slot 310.

In some cases, as illustrated in FIG. 3A, the UE 115 may implement the dynamic determination procedure for a slot 310 according to a first mode. For example, the first mode may be associated with performing the dynamic determination procedure for a single slot 310 (e.g., for flexible slot 310-*c*). In some other examples, as illustrated in FIG. 3B, a second mode may be associated with the UE 115 repeating the dynamic determination procedure over a number of slots 310. In this case, the UE 115 may determine and apply updated slot format 330-*b* to flexible slot 310-*e*, and then apply repetitions of updated slot format 330-*b* to one or more subsequent slots 310 (e.g., flexible slot 310-*e*, flexible slot 310-*f*, and flexible slot 310-*g*). The dynamic determination procedure, and the repetitions of updated slot format 330-*b* may repeat until the UE 115 receives another indication of dynamic determination 325, or for a specified repetition period, for a number of repetitions, or a combination thereof. In some cases, the repetition period may be a predetermined value, specified in the indication of dynamic determination 325, or specified by other means. Additionally, the use of the first mode, the second mode, or a combination thereof, may be indicated to the UE 115 by a base station 105 (e.g., in RRC signaling, a DCI message, or both). In some cases, the mode may be indicated in the same or different signaling that indicates the determination timeline 320 to the UE 115.

FIG. 4A and 4B illustrate examples of slot diagrams 400 and 405 that supports capability relaxation for slot format determination for wireless communications systems in accordance with aspects of the present disclosure. In some examples, slot diagrams 400 and 405 may implement aspects of wireless communications system 100, wireless communications system 200, or both. For instance, slot diagrams 400 and 405 may each illustrate a timeframe in which a UE 115 updates or applies an indicated format to a one or more symbols in a flexible slot based on a configured duration. Slot diagrams 400 and 405 include slots 410, which may be respective examples of slots 205 and 310 as described with reference to FIGS. 2, 3A, and 3B. Slot diagrams 400 and 405 also include indications of dynamic determinations 425, and updated slot formats 430 and 435, which may be respective examples the indication of dynamic determinations 325 and updated slot formats 330 described with reference to FIGS. 3A and 3B.

In some cases, a UE 115 may identify a duration associated with determining a configuration (e.g., a configuration duration 420) based on an indication from a base station 105, a predetermined value, or capabilities of the UE 115. The indication of the configuration duration 420 may be received in control signaling, such as RRC signaling, in a DCI message, or a combination thereof. Configuration duration 420 may include any number of slots 410. For example, configuration duration 420-*a* may include four slots 410, while configuration duration 420-*b* may include five slots 410, as illustrated in FIG. 4A and 4B, respectively. It is noted that although four and five slots 410 are used for the described examples of the configuration durations 420, any number of slots 410 or other durations (e.g., in units of time) may be used for the configuration duration 420.

The UE 115 may dynamically receive an indication of a slot configuration (e.g., an indication of a dynamic determination 425) from the base station 105, which may be an example of an indication transmitted in a DCI message during a downlink slot 410 (e.g., slot 410-*a* or slot 410-*f*). For example, as illustrated in FIG. 4A, slot 410-*a* may be the last downlink slot 410 according to an indicated RRC cell-specific slot format configuration. The UE 115 may receive the indication of dynamic determination 425-*a* from the base station 105 within downlink slot 410-*a*. The indication of the dynamic determination 425 may include an RRC configuration, a DCI indication (e.g., DCI format 2_0), or both. The last downlink symbol in downlink slot 410-*a* may be followed by one or more flexible slots, uplink slots 410, or both (e.g., flexible slot 410-*b* and flexible slot 410-*c* in addition to one or more uplink slots 410). The UE 115 may perform a dynamic determination procedure (based on the indication of dynamic determination 425-*a*) within the indicated configuration duration 420-*a*. For instance, an updated slot format 430-*a* configured by the indication of dynamic determination 425-*a* may be applied to flexible slot 410-*b* that occurs within configuration duration 420-*a*. In some examples, a threshold number of updated slot formats 430 may be applied to slots 410 during the configuration duration 425. Additionally or alternatively, updated slot format 430-a may be applied to flexible slot 410-c.

In some cases, the UE 115 may not monitor for additional indications of a dynamic determination 425 during the configuration timeframe 420. Specifically, the UE 115 may receive the indication of dynamic determination 425-a, initiate a timer or clock for configuration duration 420-a, apply updated slot format 430-a to flexible slot 410-b, and then refrain from monitoring for further indications of slot format configurations 425 (e.g., transmitted in DCI or in RRC signaling). As such, the UE 115 may relax monitoring, thereby reducing power consumption associated with monitoring for signals (for instance, the UE 115 may power down an RF chain while refraining from monitoring through configuration duration 420-a). However, upon expiration of configuration duration 420-a, the UE 115 may resume monitoring for additional indications of a slot format. Thus, a subsequent or adjacent determination of a slot format using an additional indication of dynamic determination 425-b may occur after configuration duration 420-a. As such, the UE 115 may apply an updated slot format 435-a to flexible slot 410-d, at which time the UE 115 may optionally use configuration duration 420-a again.

In cases where the dynamic determination procedure is based on a threshold, the UE 115 may apply the threshold number of updated slot formats 430 (or updated slot formats 435) based on the threshold. For instance, if a threshold number of times for applying a slot format during configuration duration 425-a is one (e.g., as included with the indication of dynamic determination 425-a), and configuration duration 420-a is four slots, the number of slots 410 between applying updated slot format 430-a to flexible slot 410-b and applying updated slot format 435-a to flexible slot 410-d may also be four slots. Thus, if the base station 105 attempted to transmit an additional indication of the dynamic determination 425 (e.g., within configuration duration 420-a), the UE 115 may not receive the indication of the dynamic determination 420 due to already being at a threshold number of dynamic determination procedures (e.g., if the threshold is one).

Similarly, as illustrated in FIG. 4B, the UE 115 may receive an indication of dynamic determination 425-c, then may perform dynamic determination procedures to multiple slots 410 according to the threshold value of dynamic determination procedures for configuration duration 420-b. In particular, as opposed to applying an updated slot format 430 to a single slot 410, the UE 115 may apply the updated slot format 430 with repetitions over multiple slots 410. For instance, the indication of dynamic determination 425-c may correspond to the UE 115 applying updated slot format 430-b at slot 410-e. The UE 115 may then repeat the application of updated slot format 430-b at flexible slots 410 that are within configuration duration 420-b (e.g., flexible slot 410-f and flexible slot 410-g). In some examples, if a base station 105 attempted to transmit an additional indication of a dynamic determination 420 during configuration duration 425-b, the UE 115 may not receive the indication until after configuration duration 420-b (e.g., because the UE 115 may refrain from monitoring for some downlink transmissions). In some other examples, the UE 115 may receive an additional indication of a dynamic determination 425, but may wait until after configuration duration 420-b before acting on the received indication. In some cases, because the base station 105 may be aware that the UE 115 is implementing configuration duration 420-b, the UE 115 may receive an additional indication of dynamic determination 420-d at slot 410-h, after configuration duration 425-b. The UE 115 may then perform the dynamic determination procedure by applying updated slot format 435-b to flexible slot 410-h.

In some cases, as illustrated in FIG. 4A, the UE 115 may perform the dynamic determination procedure according to a first mode. For example, the first mode may correspond to performing the dynamic determination procedure for a single slot 410 (e.g., for flexible slot 410-a). In some other examples, as illustrated in FIG. 3B, a second mode may correspond to the UE 115 repeating a dynamic determination procedure, which may correspond to the slot format provided by indication of dynamic determination 425-b, for one or more slots 410 (e.g., for flexible slot 410-e, flexible slot 410-f, and flexible slot 410-g) in accordance with the second mode. Here, the dynamic determination procedure may repeat until the UE 115 receives another indication of dynamic determination at 420-d, or for a specified repetition period, or a combination thereof. In some cases, the repetition period may be a predetermined value, specified in the indication of dynamic determination 425, or specified by other means. Additionally, the use of the first mode, the second mode, or a combination thereof, may be indicated to the UE 115 by the base station 105 (e.g., in RRC signaling or in a DCI message). In some cases, the mode may be indicated in the same or different signaling that indicates the configuration duration 420 to the UE 115.

Figure 5:
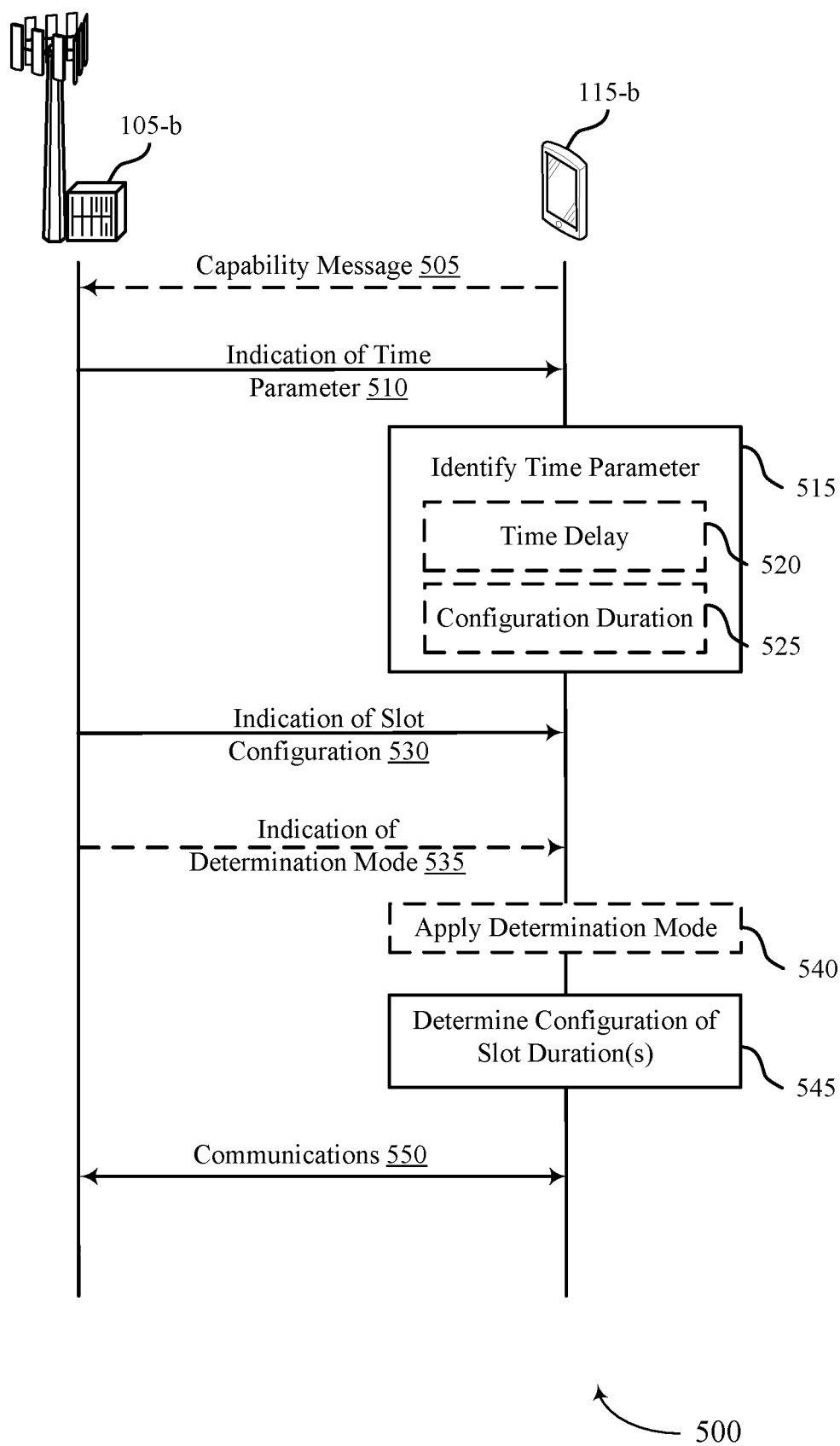
FIG. 5 illustrates an example of a process flow in a system that supports techniques for relaxing a slot format determination in accordance with aspects of the present disclosure.

FIG. 5 illustrates an example of a process flow 500 in a system that supports techniques for relaxing a slot format determination in accordance with aspects of the present disclosure. In some examples, process flow 500 may implement aspects of wireless communications systems 100, wireless communications systems 200, slot diagram 300, slot diagram 305, slot diagram 400, slot diagram 405, or a combination thereof. Process flow 500 may include UE 115-b and base station 105-b, which may be respective examples of a UE 115 and a base station 105 as described with reference to FIGS. 1 and 2. In some examples, UE 115-b may utilize a time delay or a duration associated with determining a slot format to relax slot format determination procedures. Alternative examples of the process flow 500 may be implemented, where some processes are performed in a different order than described or are not performed. In some cases, processes may include additional features not mentioned below, or further processes may be added.

At 505, UE 115-b may determine a capability and transmit the determined capability in a capability message to base station 105-b. Base station 105-b may select a time parameter (e.g., a time delay or a duration) that UE 115-b supports based on the capability message. In some cases, UE 115-b may transmit a UE type or a mode in addition to, or instead of, the capability message. For example, UE 115-b may have a reduced complexity type, or may be operating based on a low-power, or low-tier mode. As such, base station 105-b may determine the time parameter based on the UE type or mode.

At 510, base station 105-b may transmit an indication of the time parameter to UE 115-b. The indication of the time parameter may include an RRC control message (e.g., UE-specific signaling), SFI included in DCI (e.g., where the DCI is DCI format 2_0), or a combination thereof. In some cases, base station 105-b may transmit the indication of the time parameter based on the capability message from UE 115-b. For example, the capability message may indicate that UE 115-b supports a time delay time parameter, so base station 105-b may transmit a time delay as the time parameter. In some other examples, the capability message may indicate that UE 115-*b* supports a configuration duration, so base station 105-*b* may transmit a configuration duration as the time parameter.

At 515, UE 115-*b* may identify the time parameter from the indication. In some cases, at 520, the time parameter may be a time delay (e.g., a determination timeline described herein). In some other cases, at 525, the time parameter may be a configuration duration. In some examples, UE 115-*b* may identify both the time delay and the configuration duration.

At 530, base station 105-*b* may indicate a slot configuration to UE 115-*b*. In some cases, the slot configuration may be associated with a slot duration. The slot duration may include flexible symbol periods that support uplink communication, downlink communication, or a combination thereof. In some cases, if UE 115-*b* identifies the time parameter as a configuration duration, UE 115-*b* may refrain from monitoring for additional indications of slot configurations within the configuration duration. UE 115-*b* may resume monitoring for additional indications once the configuration duration expires.

At 535, base station 105-*b* may indicate a determination mode to UE 115-*b*. In some cases, the determination mode may be a first determination mode. The first determination mode may correspond to determining a configuration of a single slot duration. In some other cases, the determination mode may be a second determination mode. The second determination mode may correspond to determining a configuration of multiple slot durations.

At 540, UE 115-*b* may apply the determination mode received at 535. For example, UE 115-*b* may either configure a single sot duration or repeat the determined configuration.

At 545, UE 115-*b* may determine the configuration of one or more slot durations. For example, if the time parameter is a time delay, UE 115-*b* may wait until after the time delay to configure the single slot duration. If the time parameter is a configuration duration, UE 115-*b* may determine the configuration of a single slot duration within the identified duration (e.g., according to the first determination mode). Additionally or alternatively, UE 115-*b* may determine the configuration of a first slot duration within the identified duration, and then repeat the determined configuration for one or more additional slot durations within the configuration duration (e.g., according to the second determination mode). In some other examples, where the time parameter is a time delay, UE 115-*b* may determine the configuration of a first slot duration after the time delay. UE 115-*b* may also repeat the determined configuration for one or more additional slot durations after the time delay. If the time parameter is a configuration duration, in some cases, UE 115-*b* may repeat the determined configuration until the end of a specified repetition period or until a second indication of a slot configuration is received.

In some cases, UE 115-*b* may determine the configuration based on the communication direction of a slot duration (e.g., uplink or downlink). In some other cases, UE 115-*b* may determine the configuration based on the type of channel scheduled for communication during a slot duration. For example, the channel may be a PUSCH, PDSCH, or downlink data channel. In some examples, UE 115-*b* may receive a slot configuration from base station 105-*b* (e.g., a slot configuration different than the slot configuration at 530), which may indicate a portion of a slot duration to be used for uplink transmission. For example, the portion of the slot duration may include one or more symbol periods.

At 550, UE 115-*b* and base station 105-*b* may communicate during one or more slot durations based on configurations determined at 540.

Figure 6:
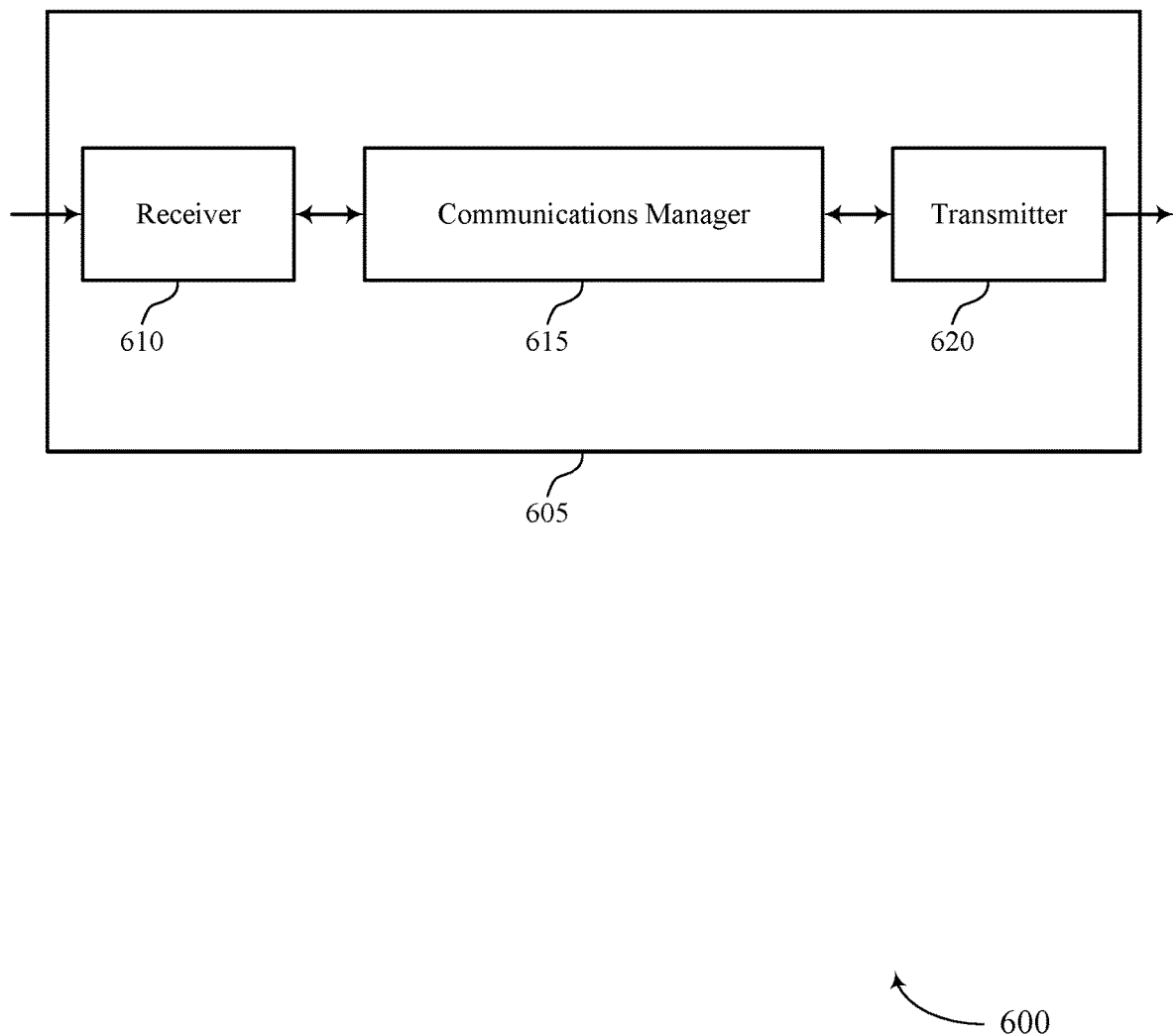
FIGS. 6 and 7 show block diagrams of devices that support techniques for relaxing a slot format determination in accordance with aspects of the present disclosure.

FIG. 6 shows a block diagram 600 of a device 605 that supports techniques for relaxing a slot format determination in accordance with aspects of the present disclosure. The device 605 may be an example of aspects of a UE 115 as described herein. The device 605 may include a receiver 610, a communications manager 615, and a transmitter 620. The device 605 may also include at least one processor. Each of these components may be in communication with one another (e.g., via one or more buses).

The receiver 610 may receive information such as packets, user data, or control information associated with various information channels (e.g., control channels, data channels, and information related to techniques for relaxing a slot format determination). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a time delay associated with determining a configuration associated with a slot duration, receive an indication of a slot configuration, and determine, after the identified time delay, a configuration of one or more slot durations based on the received indication of the slot configuration. The communications manager 615 may also identify a duration associated with determining a configuration associated with a slot duration, receive an indication of a slot configuration, and determine, within the identified duration, a configuration of one or more slot durations based on the received indication of the slot configuration. The communications manager 615 may be an example of aspects of the communications manager 910 described herein.

The actions performed by the communications manager 615 as described herein may be implemented to realize one or more potential advantages. One implementation may enable a network, such as a base station, to transmit a time parameter and an indication of a slot configuration to a UE. Such indications may enable techniques for relaxing a slot format determination, which may result in improved UE complexity and more efficient communications (e.g., decreased latency in the system), among other advantages.

Based on implementing the indications as described herein, a processor of a UE or base station (e.g., a processor controlling the receiver 610, the communications manager 615, the transmitter 620, or a combination thereof) may reduce the complexity of a slot format determination procedure while ensuring relatively efficient communications. For example, the reporting techniques described herein may leverage a time delay or a configurated duration during a slot format determination procedure, which may realize reduced signaling overhead and power savings, among other benefits.

The communications manager 615, or its sub-components, may be implemented in hardware, software (e.g., executed by at least one processor), or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
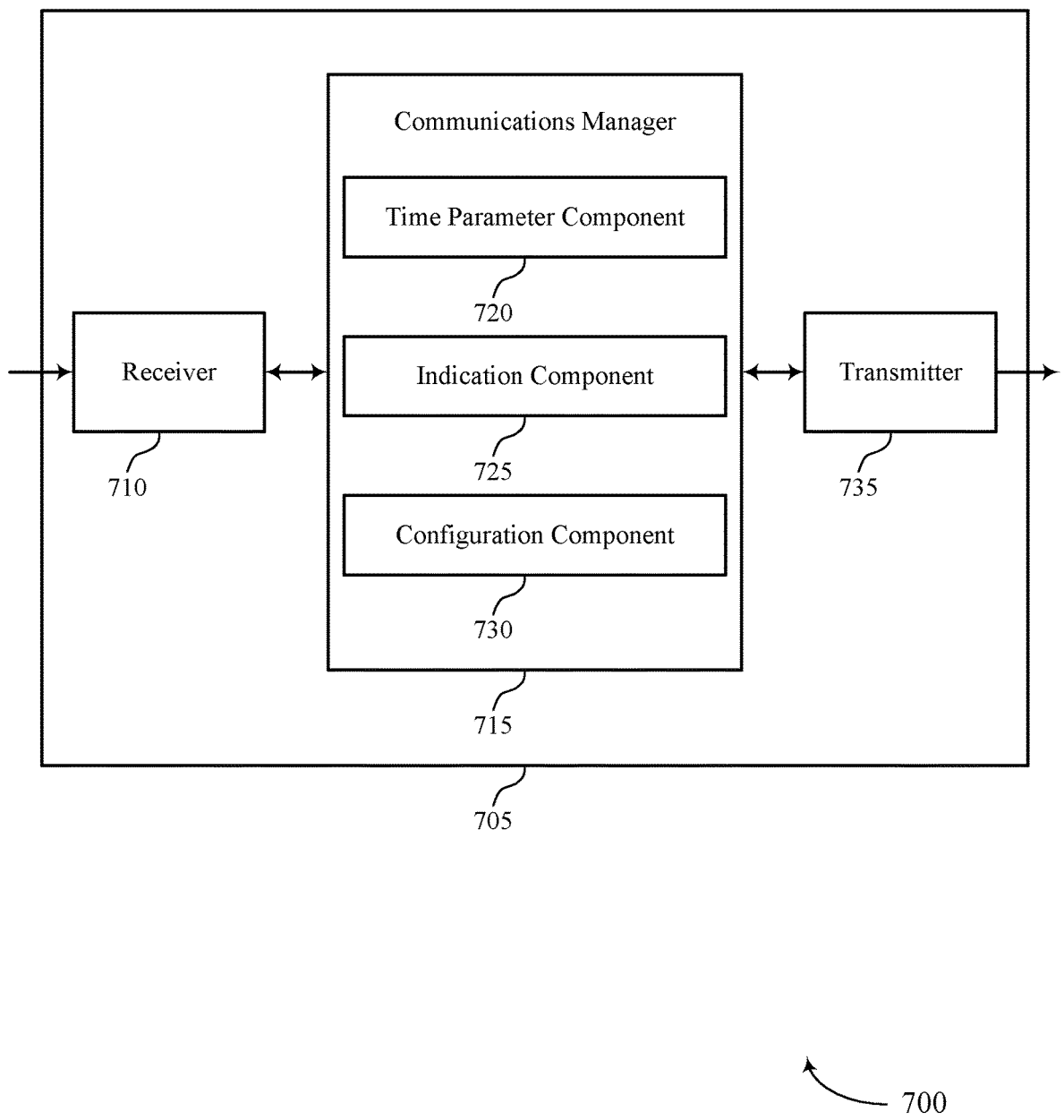

FIG. 7 shows a block diagram 700 of a device 705 that supports techniques for relaxing a slot format determination in accordance with aspects of the present disclosure. The device 705 may be an example of aspects of a device 605, or a UE 115 as described herein. The device 705 may include a receiver 710, a communications manager 715, and a transmitter 735. The device 705 may also include at least one processor. Each of these components may be in communication with one another (e.g., via one or more buses).

The receiver 710 may receive information such as packets, user data, or control information associated with various information channels (e.g., control channels, data channels, and information related to techniques for relaxing a slot format determination). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a time parameter component 720, an indication component 725, and a configuration component 730. The communications manager 715 may be an example of aspects of the communications manager 910 described herein.

The time parameter component 720 may identify a time delay associated with determining a configuration associated with a slot duration. The indication component 725 may receive an indication of a slot configuration. The configuration component 730 may determine, after the identified time delay, a configuration of one or more slot durations based on the received indication of the slot configuration.

The time parameter component 720 may identify a duration associated with determining a configuration associated with a slot duration. The indication component 725 may receive an indication of a slot configuration. The configuration component 730 may determine, within the identified duration, a configuration of one or more slot durations based on the received indication of the slot configuration.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
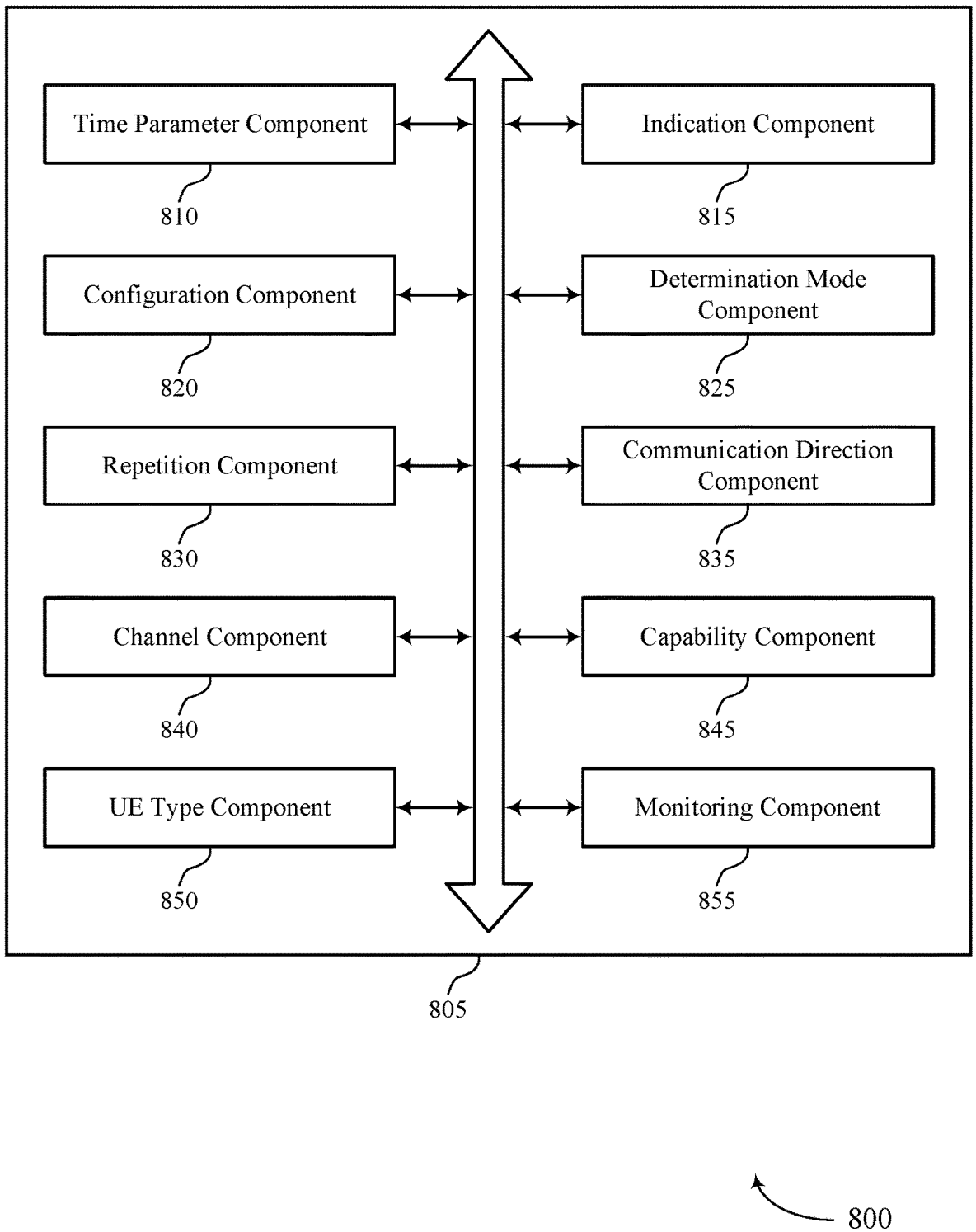
FIG. 8 shows a block diagram of a communications manager that supports techniques for relaxing a slot format determination in accordance with aspects of the present disclosure.

FIG. 8 shows a block diagram 800 of a communications manager 805 that supports techniques for relaxing a slot format determination in accordance with aspects of the present disclosure. The communications manager 805 may be an example of aspects of a communications manager 615, a communications manager 715, or a communications manager 910 described herein. The communications manager 805 may include a time parameter component 810, an indication component 815, a configuration component 820, a determination mode component 825, a repetition component 830, a communication direction component 835, a channel component 840, a capability component 845, a UE type component 850, and a monitoring component 855. Each of these modules may communicate, directly or indirectly, with one another (e.g., via one or more buses).

The time parameter component 810 may identify a time delay associated with determining a configuration associated with a slot duration.

In some examples, the time parameter component 810 may identify a duration associated with determining a configuration associated with a slot duration.

The indication component 815 may receive an indication of a slot configuration. In some examples, the indication component 815 may receive an indication of one or more slot configurations, for example a first and a second slot configuration. In some examples, the indication component 815 may receive an RRC message including an indication of the time delay, where the time delay is identified based on the received RRC message. In some examples, the indication component 815 may receive DCI including an indication of the time delay, where the time delay is identified based on the received DCI. In some examples, the indication component 815 may receive a RRC message including an indication of the duration, where the duration is identified based on the received RRC message. In some examples, the indication component 815 may receive DCI including an indication of the duration, where the duration is identified based on the received DCI.

The configuration component 820 may determine, after the identified time delay, a configuration of one or more slot durations based on the received indication of the slot configuration. In some examples, the configuration component 820 may determine, within the identified duration, a configuration of one or more slot durations based on the received indication of the slot configuration. In some cases, the configuration component 820 may determine, upon receipt of the indication of the second slot configuration, a configuration of a portion of a subsequent slot duration. In some examples, the configuration component 820 may receive DCI including an SFI including the indication of the slot configuration.

In some examples, the configuration component 820 may receive UE-specific signaling that includes the indication of the slot configuration. In some examples, the configuration component 820 may communicate with a base station during the one or more slot durations based on the determined configuration of the one or more slot durations. In some examples, the configuration component 820 may determine, upon receipt of the indication of the slot configuration, a configuration of a portion of a slot duration of the one or more slot durations within the identified duration. In some examples, the configuration component 820 may receive DCI including an SFI, where the SFI includes the indication of the slot configuration.

In some examples, the configuration component 820 may receive UE-specific signaling that includes the indication of the slot configuration. In some examples, the configuration component 820 may communicate with a base station during the one or more slot durations based on the determined configuration of the one or more slot durations. In some cases, the configuration of the portion of the subsequent slot duration includes one or more symbol periods configured for uplink transmissions. In some cases, the DCI includes DCI format 2_0. In some cases, the one or more slot durations include slot durations that each include a set of flexible symbol periods supporting uplink communication, downlink communication, or a combination thereof.

The determination mode component 825 may receive an indication of a first determination mode that corresponds to determining a configuration of a single slot duration, where determining the configuration of the one or more slot durations includes determining, after the identified time delay, the configuration of the single slot duration in accordance with the first determination mode.

The determination mode component 825 may receive an indication of a second determination mode that corresponds to determining a configuration of multiple slot durations, where determining the configuration of the one or more slot durations includes determining, after the identified time delay, the configuration of a first slot duration of the one or more slot durations, and applying repetitions of the determined configuration to one or more additional slot durations in accordance with the second determination mode. The repetition component 830 may apply repetitions based on a repetition period, or until a second indication of a slot configuration is received, or a combination thereof.

The communication direction component 835 may identify a first communication direction of the one or more slot durations, where determining the configuration of the one or more slot durations after the identified time delay is based on the first communication direction. In some examples, the communication direction component 835 may identify a first communication direction of the one or more slot durations, where determining the configuration of the one or more slot durations within the identified duration is based on the first communication direction.

The channel component 840 may identify a type of a channel scheduled for communication during the one or more slot durations, where determining the configuration of the one or more slot durations after the identified time delay is based on the type of the channel. In some examples, the channel component 840 may identify a type of a channel scheduled for communication during the one or more slot durations, where determining the configuration of the one or more slot durations within the identified duration is based on the type of the channel. In some cases, the type of the channel includes a PUSCH, a PDSCH, or a combination thereof.

The capability component 845 may transmit, to a base station, a capability message that indicates the UE supports the time delay associated with determining the configuration associated with the slot duration, where the time delay is identified based on the transmitted capability message. In some examples, the capability component 845 may transmit, to a base station, a capability message that indicates the UE supports the duration associated with determining the configuration associated with the slot duration, where identifying the duration is based on the capability message. In some cases, an indication of the duration or time delay may be received, where receiving the indication of the duration or time delay may be based on the capability message.

The UE type component 850 may transmit, to a base station, a message that indicates a type of the UE, where the time delay is identified based on the type of the UE. In some examples, the UE type component 850 may transmit, to a base station, a message that indicates a type of the UE, where identifying the duration is based on the type of the UE. In some cases, an indication of the time delay or the duration may be received based on the type of the UE.

The monitoring component 855 may refrain from monitoring for additional indications of slot configurations within the identified duration, where the refraining is based on determining the configuration of the one or more slot durations. In some examples, the monitoring component 855 may resume monitoring for the additional indications of the slot configuration upon expiration of the identified duration.

Figure 9:
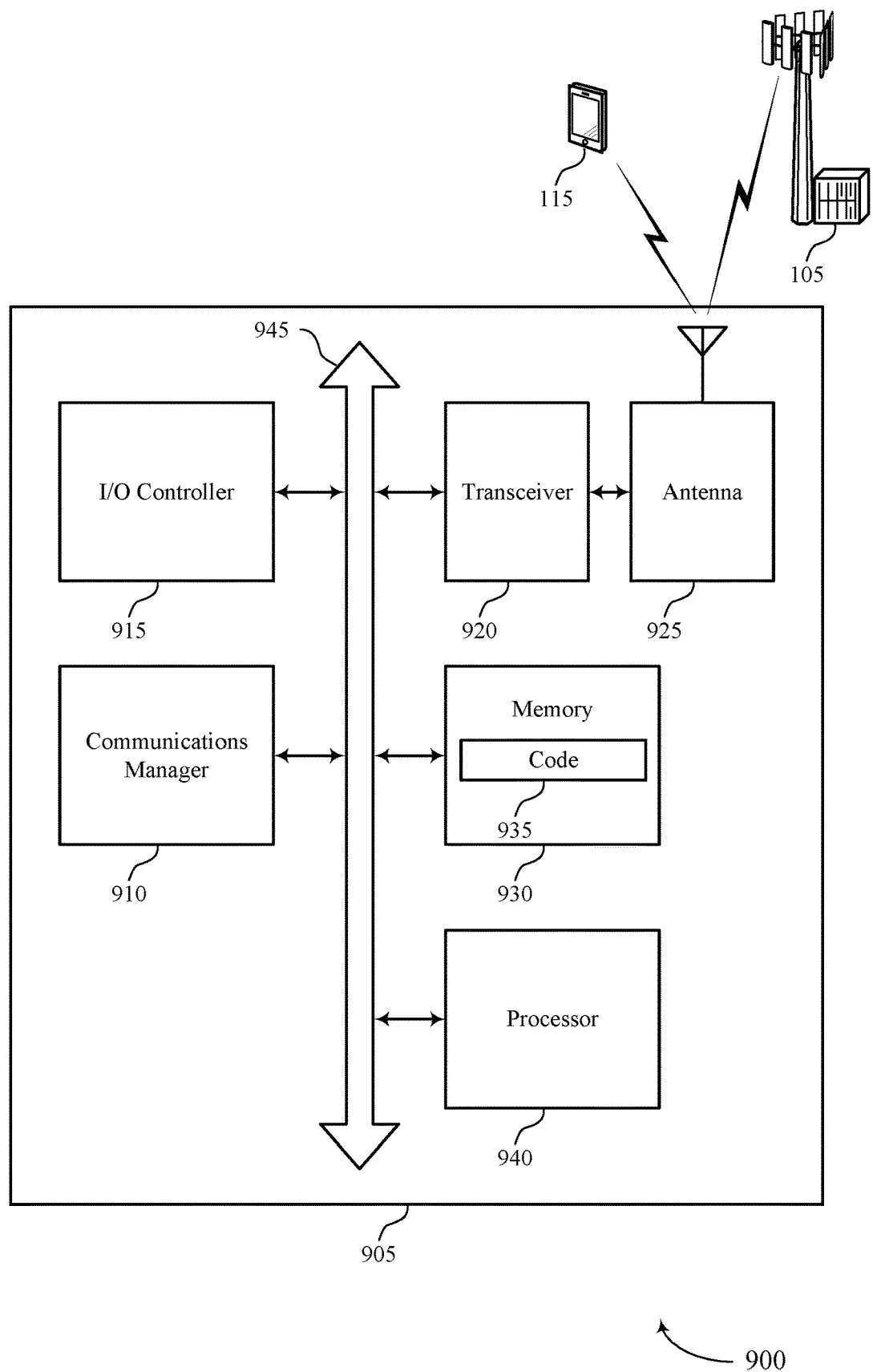
FIG. 9 shows a diagram of a system including a device that supports techniques for relaxing a slot format determination in accordance with aspects of the present disclosure.

FIG. 9 shows a diagram of a system 900 including a device 905 that supports techniques for relaxing a slot format determination in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a time delay associated with determining a configuration associated with a slot duration, receive an indication of a slot configuration, and determine, after the identified time delay, a configuration of one or more slot durations based on the received indication of the slot configuration. The communications manager 910 may also identify a duration associated with determining a configuration associated with a slot duration, receive an indication of a slot configuration, and determine, within the identified duration, a configuration of one or more slot durations based on the received indication of the slot configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In some other cases, the I/O controller 915 may represent or interact with a modem, a keyboard, a mouse, a touchscreen, or a similar device. In some cases, the I/O controller 915 may be implemented as part of at least one processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor 910 to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for relaxing a slot format determination).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
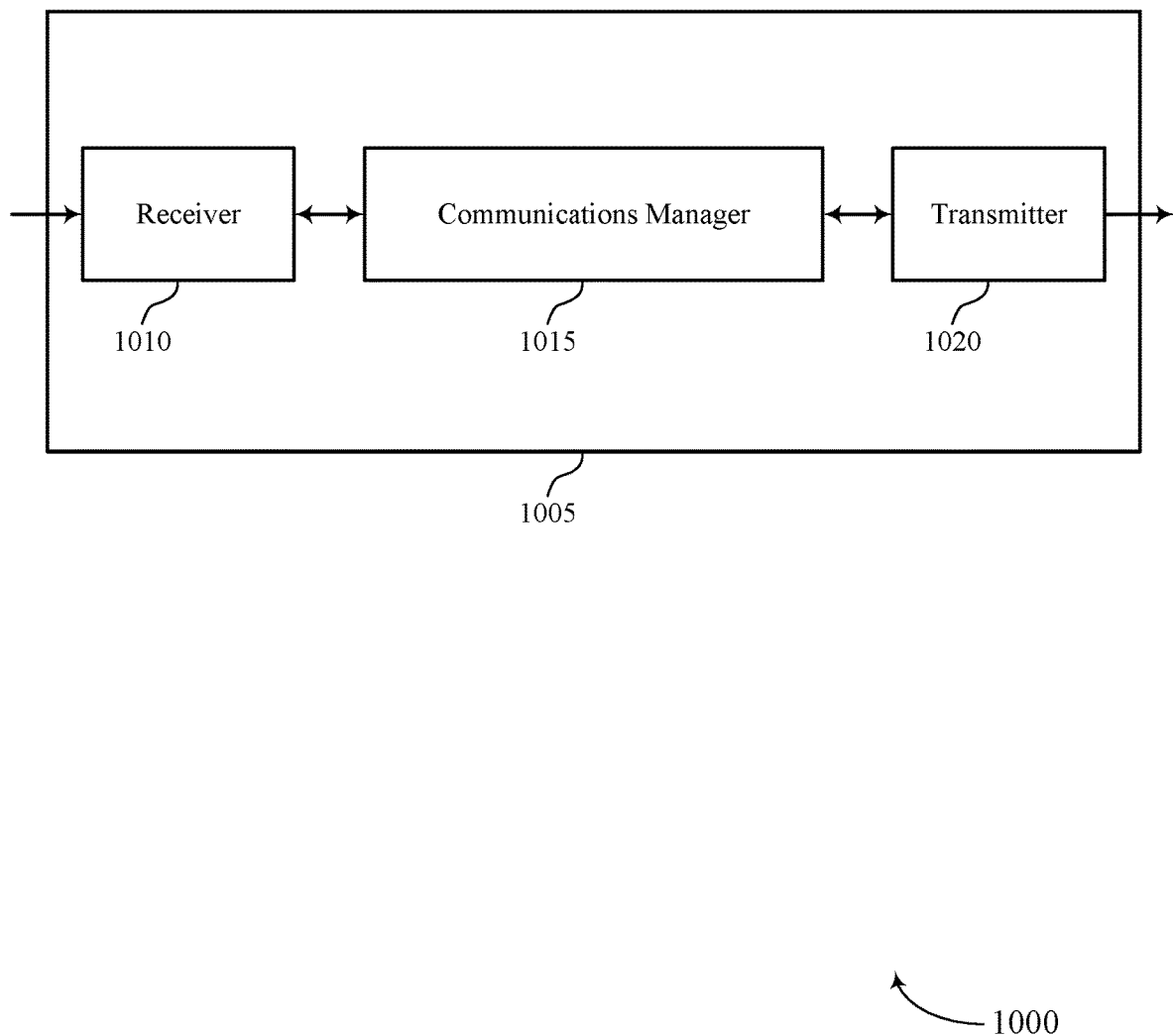
FIGS. 10 and 11 show block diagrams of devices that support techniques for relaxing a slot format determination in accordance with aspects of the present disclosure.

FIG. 10 shows a block diagram 1000 of a device 1005 that supports techniques for relaxing a slot format determination in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for relaxing a slot format determination). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, an indication of a time parameter associated with determining a configuration associated with a slot duration, transmit an indication of a slot configuration, and communicate with the UE during the one or more slot durations based on a determination of a configuration of one or more slot durations using the time parameter. The communications manager 1015 may be an example of aspects of the communications manager 1310 described herein.

The communications manager 1015, or its sub-components, may be implemented in hardware, hardware, software (e.g., executed by at least one processor), or any combination thereof. If implemented in code executed by at least one processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
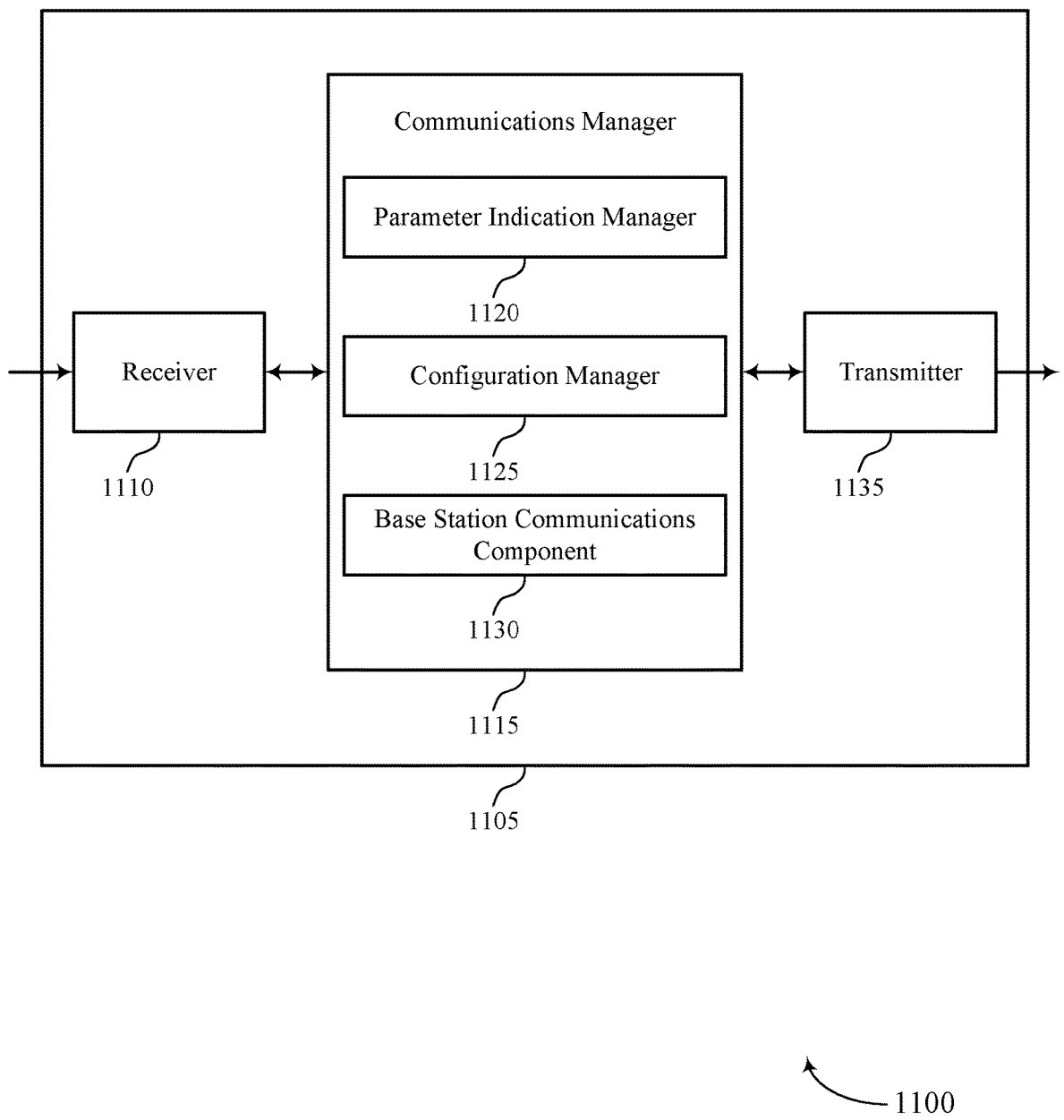

FIG. 11 shows a block diagram 1100 of a device 1105 that supports techniques for relaxing a slot format determination in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for relaxing a slot format determination). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a parameter indication manager 1120, a configuration manager 1125, and a base station communications component 1130. The communications manager 1115 may be an example of aspects of the communications manager 1310 described herein.

The parameter indication manager 1120 may transmit, to a UE, an indication of a time parameter associated with determining a configuration associated with a slot duration. The configuration manager 1125 may transmit an indication of a slot configuration. The base station communications component 1130 may communicate with the UE during the one or more slot durations based on a determination of a configuration of one or more slot durations using the time parameter.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
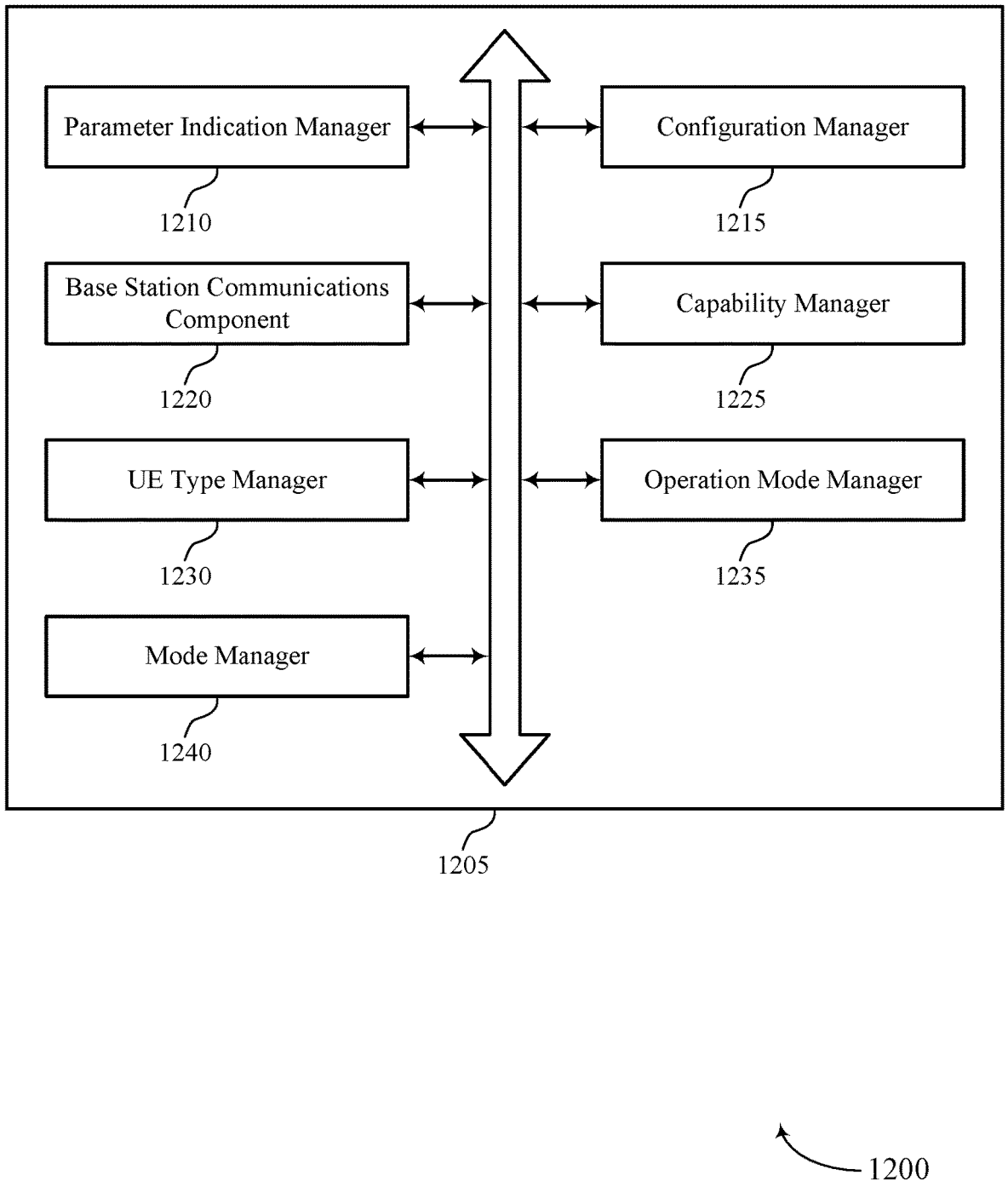
FIG. 12 shows a block diagram of a communications manager that supports techniques for relaxing a slot format determination in accordance with aspects of the present disclosure.

FIG. 12 shows a block diagram 1200 of a communications manager 1205 that supports techniques for relaxing a slot format determination in accordance with aspects of the present disclosure. The communications manager 1205 may be an example of aspects of a communications manager 1015, a communications manager 1115, or a communications manager 1310 described herein. The communications manager 1205 may include a parameter indication manager 1210, a configuration manager 1215, a base station communications component 1220, a capability manager 1225, a UE type manager 1230, an operation mode manager 1235, and a mode manager 1240. Each of these modules may communicate, directly or indirectly, with one another (e.g., via one or more buses).

The parameter indication manager 1210 may transmit, to a UE, an indication of a time parameter associated with determining a configuration associated with a slot duration. In some cases, the time parameter includes a time delay associated with determining a configuration associated with a slot duration, or a duration associated with determining a configuration of a slot duration, or a combination thereof.

The configuration manager 1215 may transmit an indication of a slot configuration. The base station communications component 1220 may communicate with the UE during the one or more slot durations based on a determination of a configuration of one or more slot durations using the time parameter.

The capability manager 1225 may receive, from the UE, a capability message that indicates the UE supports the time parameter for determining the configuration associated with the slot duration, where transmitting the indication of the time parameter is based on the received capability message. The UE type manager 1230 may receive, from the UE, a message that indicates a type of the UE, where transmitting the indication of the time parameter is based on the type of the UE. The operation mode manager 1235 may identify an operational mode of the UE, where transmitting the indication of the time parameter is based on the operational mode of the UE.

The mode manager 1240 may transmit an indication of a first determination mode that corresponds to determining a configuration of a single slot duration based on the time parameter. In some examples, the mode manager 1240 may transmit an indication of a second determination mode that corresponds to determining a configuration of multiple slot durations based on the time parameter.

Figure 13:
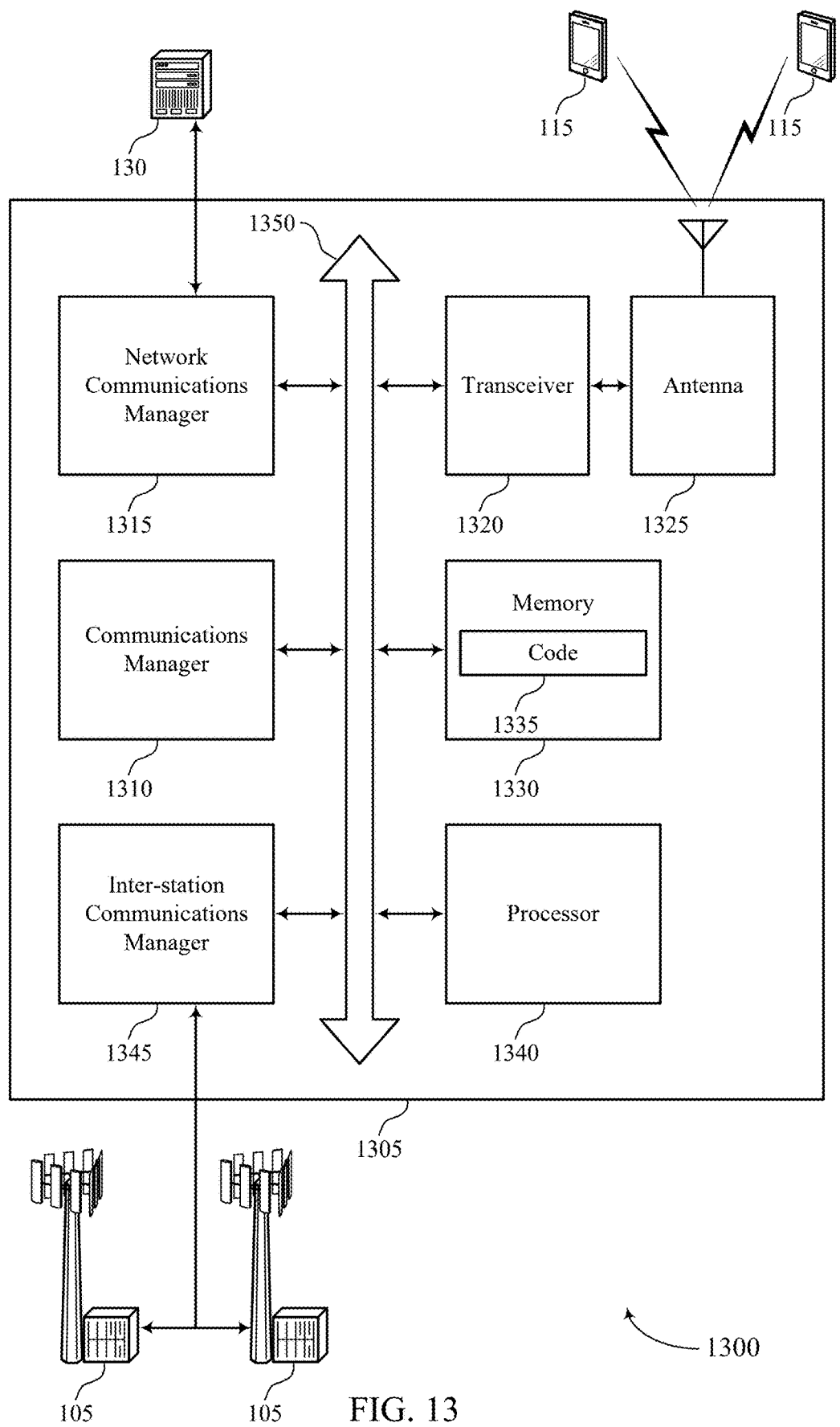
FIG. 13 shows a diagram of a system including a device that supports techniques for relaxing a slot format determination in accordance with aspects of the present disclosure.

FIG. 13 shows a diagram of a system 1300 including a device 1305 that supports techniques for relaxing a slot format determination in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, an indication of a time parameter associated with determining a configuration associated with a slot duration, transmit an indication of a slot configuration, and communicate with the UE during the one or more slot durations based on a determination of a configuration of one or more slot durations using the time parameter.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for relaxing a slot format determination).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
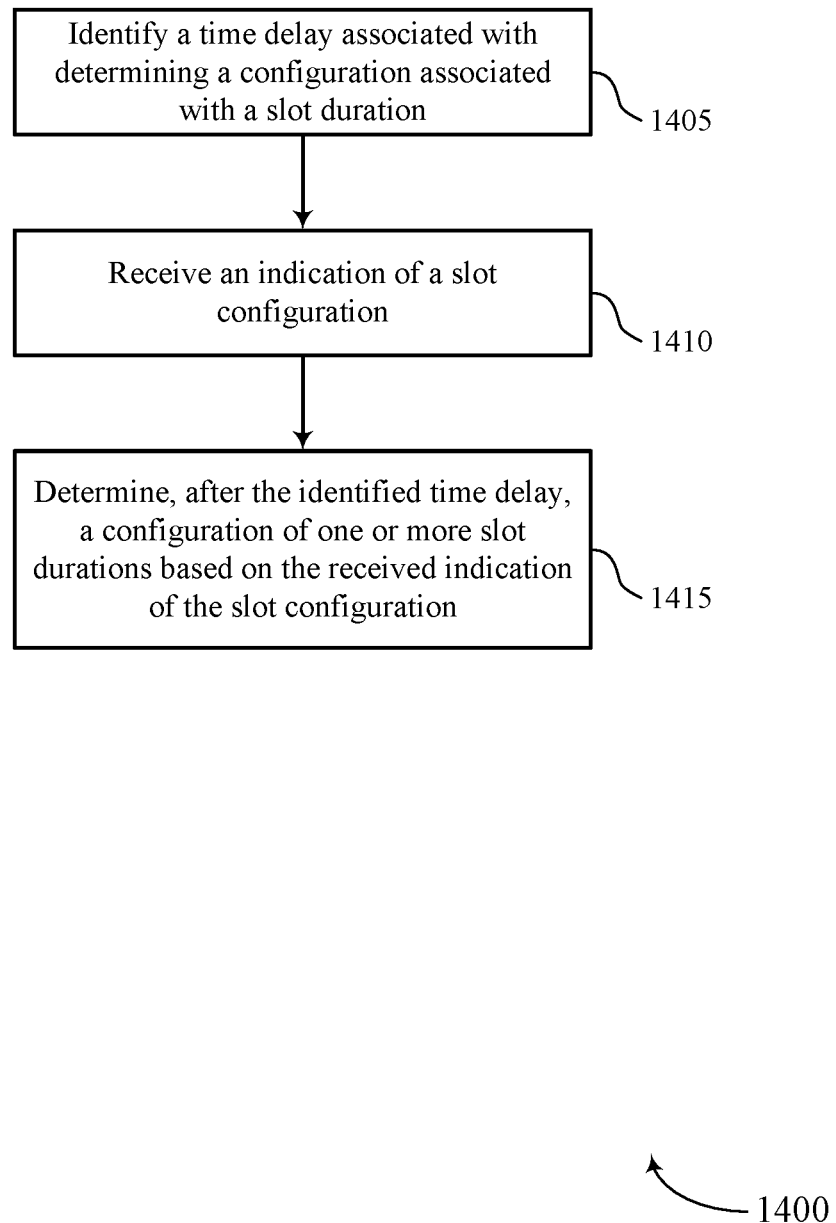
FIGS. 14 through 21 show flowcharts illustrating methods that support techniques for relaxing a slot format determination in accordance with aspects of the present disclosure.

FIG. 14 shows a flowchart illustrating a method 1400 that supports techniques for relaxing a slot format determination in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a time delay associated with determining a configuration associated with a slot duration. The operations of 1405 may be performed according to the methods described herein. In some examples, aspects of the operations of 1405 may be performed by a time parameter component as described with reference to FIGS. 6 through 9.

At 1410, the UE may receive an indication of a slot configuration. The operations of 1410 may be performed according to the methods described herein. In some examples, aspects of the operations of 1410 may be performed by an indication component as described with reference to FIGS. 6 through 9.

At 1415, the UE may determine, after the identified time delay, a configuration of one or more slot durations based on the received indication of the slot configuration. The operations of 1415 may be performed according to the methods described herein. In some examples, aspects of the operations of 1415 may be performed by a configuration component as described with reference to FIGS. 6 through 9.

Figure 15:
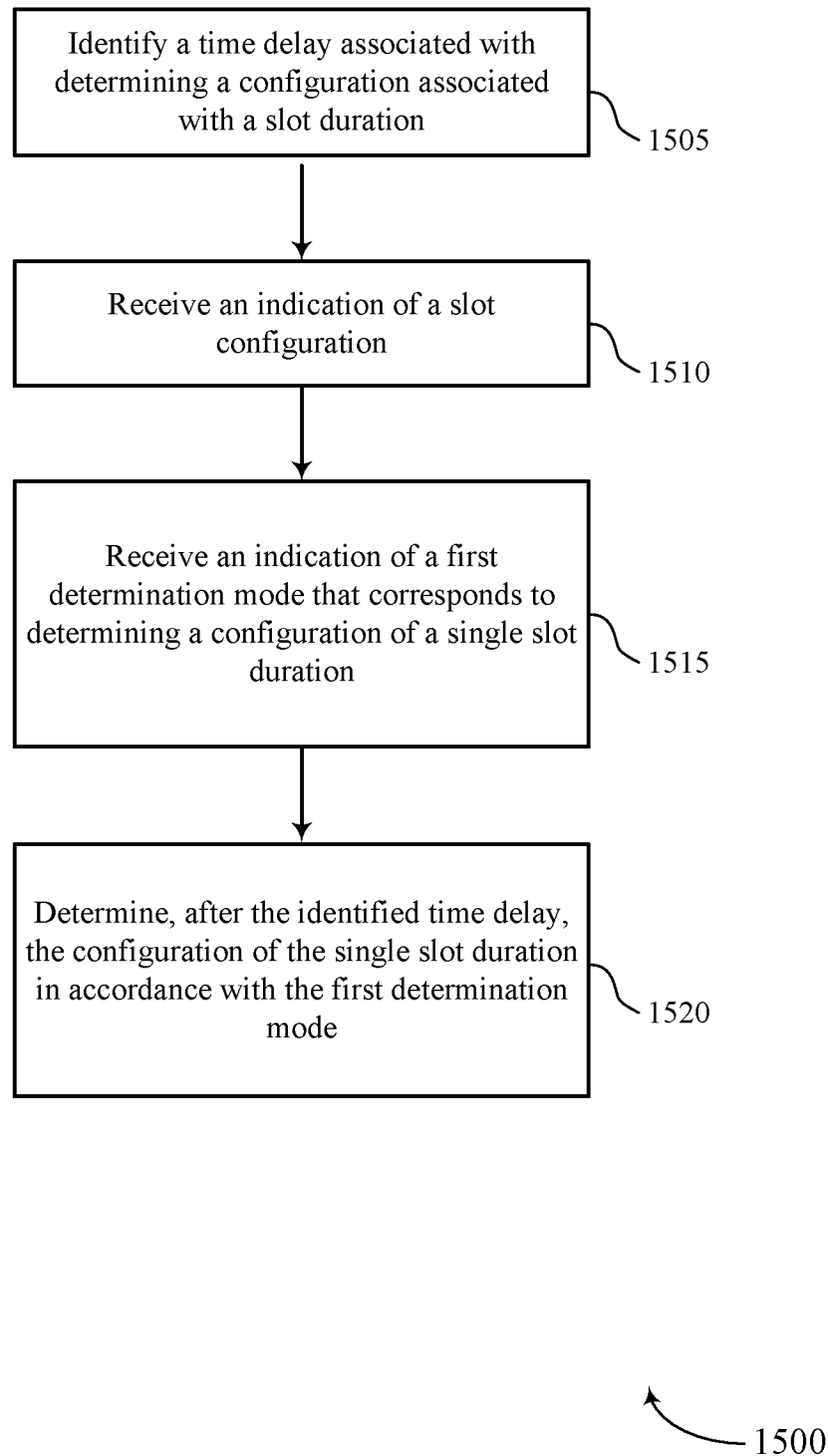

FIG. 15 shows a flowchart illustrating a method 1500 that supports techniques for relaxing a slot format determination in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a time delay associated with determining a configuration associated with a slot duration. The operations of 1505 may be performed according to the methods described herein. In some examples, aspects of the operations of 1505 may be performed by a time parameter component as described with reference to FIGS. 6 through 9.

At 1510, the UE may receive an indication of a slot configuration. The operations of 1510 may be performed according to the methods described herein. In some examples, aspects of the operations of 1510 may be performed by an indication component as described with reference to FIGS. 6 through 9.

At 1515, the UE may receive an indication of a first determination mode that corresponds to determining a configuration of a single slot duration, where determining the configuration of the one or more slot durations includes. The operations of 1515 may be performed according to the methods described herein. In some examples, aspects of the operations of 1515 may be performed by a determination mode component as described with reference to FIGS. 6 through 9.

At 1520, the UE may determine, after the identified time delay, the configuration of the single slot duration in accordance with the first determination mode. The operations of 1520 may be performed according to the methods described herein. In some examples, aspects of the operations of 1520 may be performed by a configuration component as described with reference to FIGS. 6 through 9.

Figure 16:
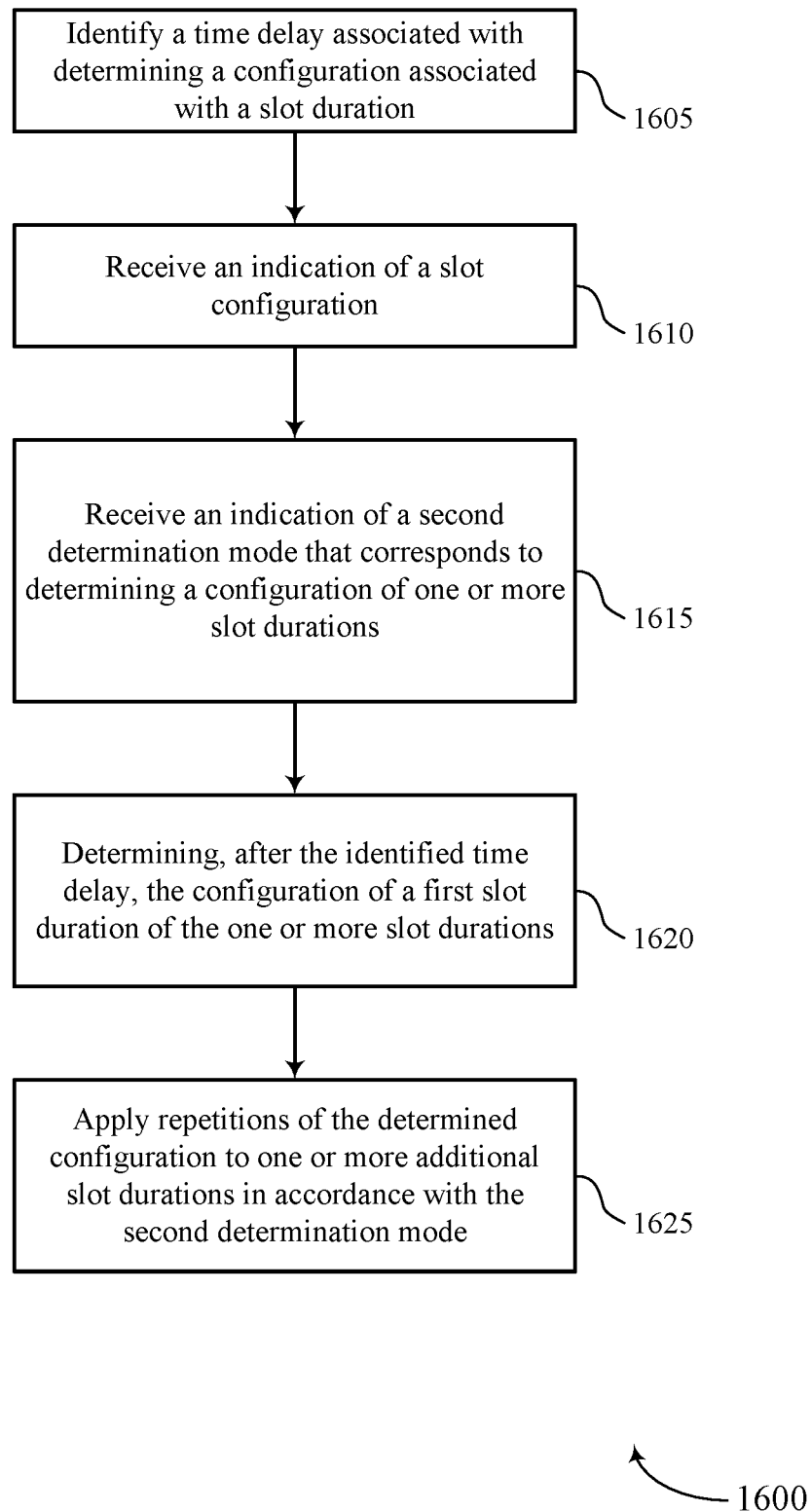

FIG. 16 shows a flowchart illustrating a method 1600 that supports techniques for relaxing a slot format determination in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a time delay associated with determining a configuration associated with a slot duration. The operations of 1605 may be performed according to the methods described herein. In some examples, aspects of the operations of 1605 may be performed by a time parameter component as described with reference to FIGS. 6 through 9.

At 1610, the UE may receive an indication of a slot configuration. The operations of 1610 may be performed according to the methods described herein. In some examples, aspects of the operations of 1610 may be performed by an indication component as described with reference to FIGS. 6 through 9.

At 1615, the UE may receive an indication of a second determination mode that corresponds to determining a configuration of multiple slot durations. The operations of 1615 may be performed according to the methods described herein. In some examples, aspects of the operations of 1615 may be performed by a determination mode component as described with reference to FIGS. 6 through 9.

At 1620, the UE may determine, after the identified time delay, a configuration of a first slot duration of the one or more slot durations. The operations of 1620 may be performed according to the methods described herein. In some examples, aspects of the operations of 1620 may be performed by a repetition component as described with reference to FIGS. 6 through 9.

At 1625, the UE may apply repetitions of the determined configuration to one or more additional slot durations in accordance with the second determination mode. The operations of 1625 may be performed according to the methods described herein. In some examples, aspects of the operations of 1625 may be performed by a configuration component as described with reference to FIGS. 6 through 9.

Figure 17:
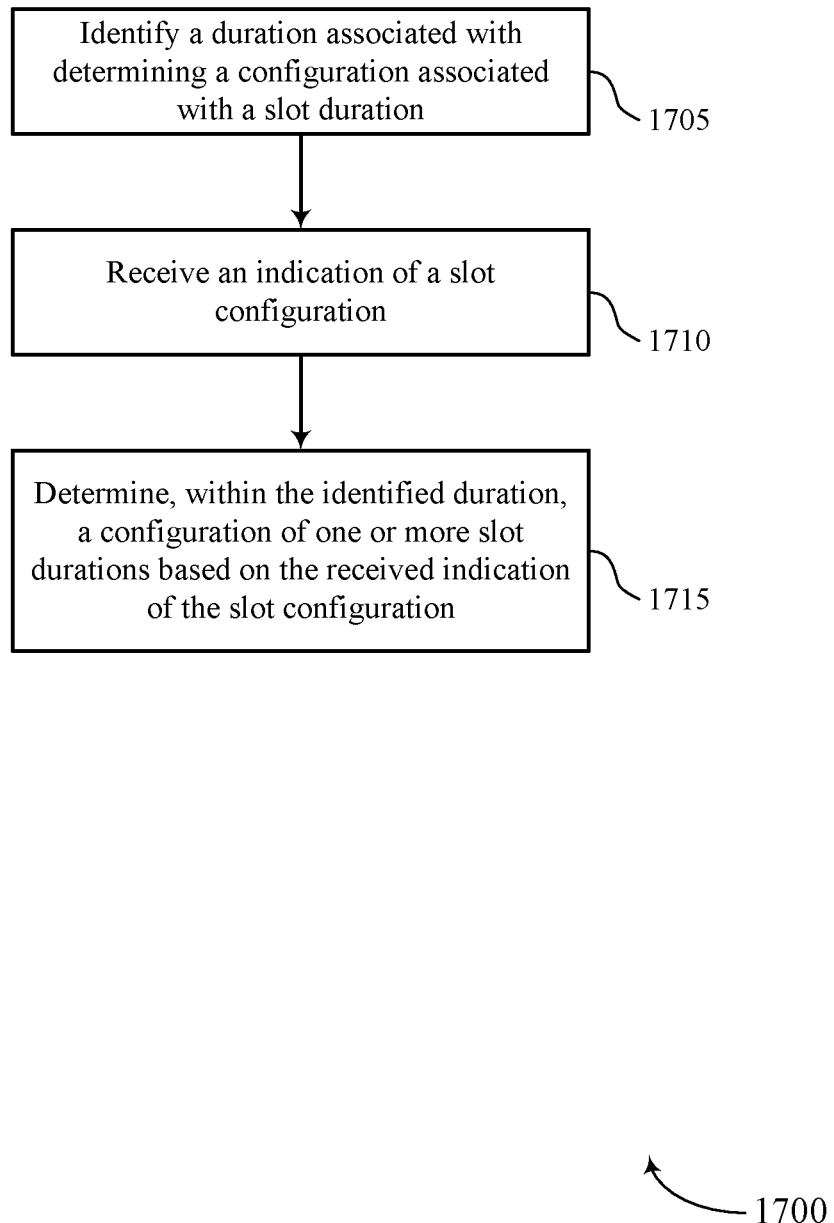

FIG. 17 shows a flowchart illustrating a method 1700 that supports techniques for relaxing a slot format determination in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may identify a duration associated with determining a configuration associated with a slot duration. The operations of 1705 may be performed according to the methods described herein. In some examples, aspects of the operations of 1705 may be performed by a time parameter component as described with reference to FIGS. 6 through 9.

At 1710, the UE may receive an indication of a slot configuration. The operations of 1710 may be performed according to the methods described herein. In some examples, aspects of the operations of 1710 may be performed by an indication component as described with reference to FIGS. 6 through 9.

At 1715, the UE may determine, within the identified duration, a configuration of one or more slot durations based on the received indication of the slot configuration. The operations of 1715 may be performed according to the methods described herein. In some examples, aspects of the operations of 1715 may be performed by a configuration component as described with reference to FIGS. 6 through 9.

Figure 18:
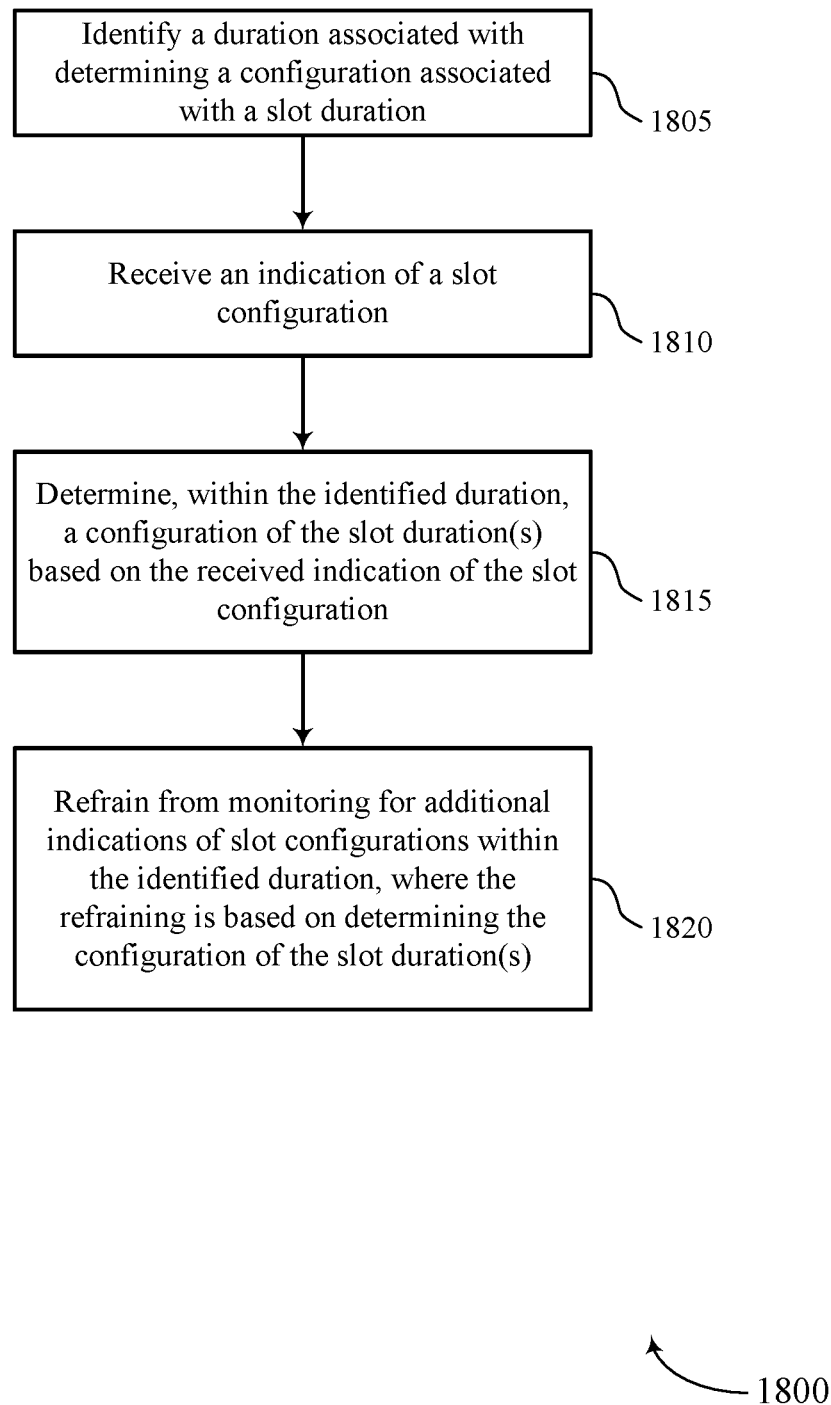

FIG. 18 shows a flowchart illustrating a method 1800 that supports techniques for relaxing a slot format determination in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may identify a duration associated with determining a configuration associated with a slot duration. The operations of 1805 may be performed according to the methods described herein. In some examples, aspects of the operations of 1805 may be performed by a time parameter component as described with reference to FIGS. 6 through 9.

At 1810, the UE may receive an indication of a slot configuration. The operations of 1810 may be performed according to the methods described herein. In some examples, aspects of the operations of 1810 may be performed by an indication component as described with reference to FIGS. 6 through 9.

At 1815, the UE may determine, within the identified duration, a configuration of one or more slot durations based on the received indication of the slot configuration. The operations of 1815 may be performed according to the methods described herein. In some examples, aspects of the operations of 1815 may be performed by a configuration component as described with reference to FIGS. 6 through 9.

At 1820, the UE may refrain from monitoring for additional indications of slot configurations within the identified duration, where the refraining is based on determining the configuration of the one or more slot durations. The operations of 1820 may be performed according to the methods described herein. In some examples, aspects of the operations of 1820 may be performed by a monitoring component as described with reference to FIGS. 6 through 9.

Figure 19:
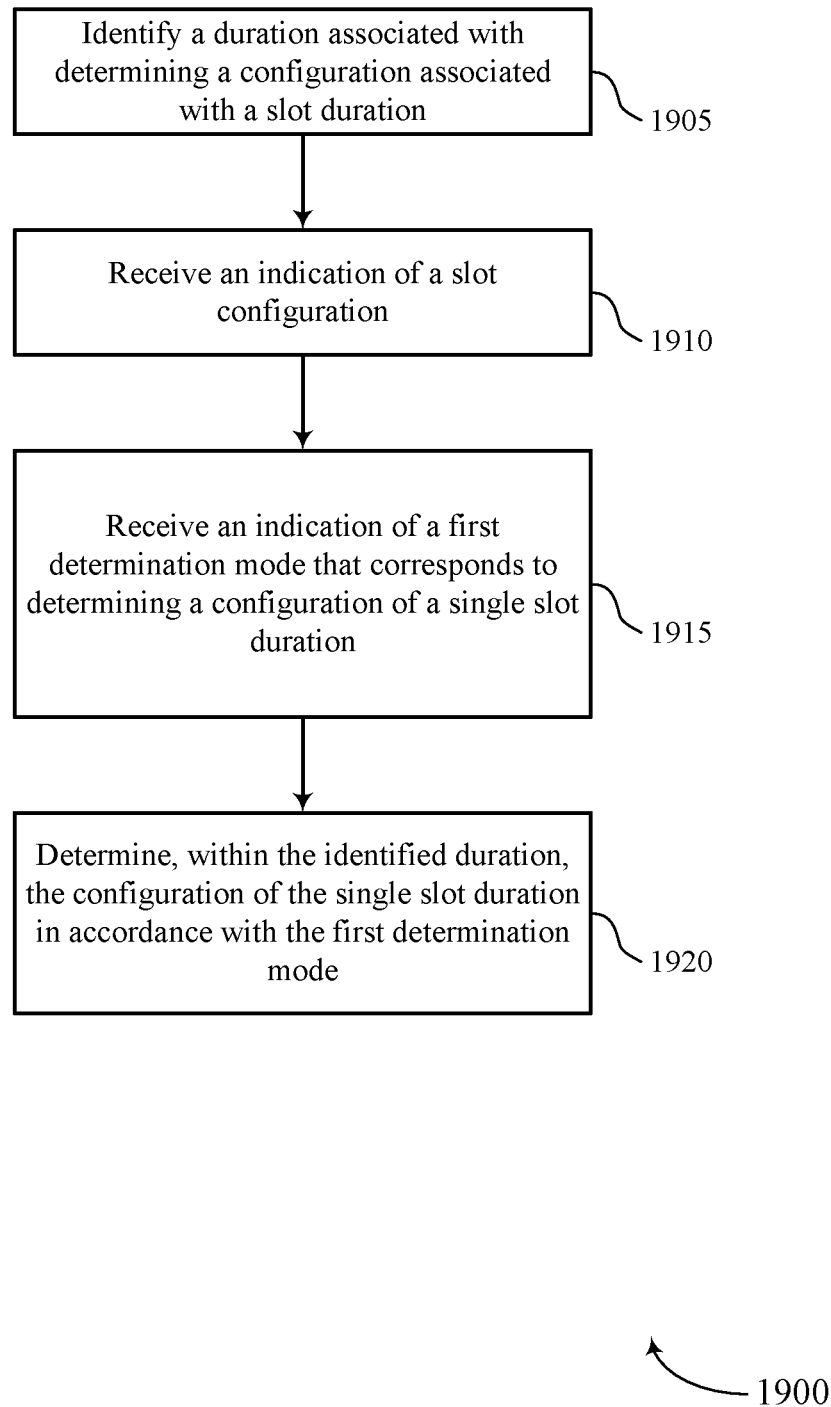

FIG. 19 shows a flowchart illustrating a method 1900 that supports techniques for relaxing a slot format determination in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1905, the UE may identify a duration associated with determining a configuration associated with a slot duration. The operations of 1905 may be performed according to the methods described herein. In some examples, aspects of the operations of 1905 may be performed by a time parameter component as described with reference to FIGS. 6 through 9.

At 1910, the UE may receive an indication of a slot configuration. The operations of 1910 may be performed according to the methods described herein. In some examples, aspects of the operations of 1910 may be performed by an indication component as described with reference to FIGS. 6 through 9.

At 1915, the UE may receive an indication of a first determination mode that corresponds to determining a configuration of a single slot duration. The operations of 1915 may be performed according to the methods described herein. In some examples, aspects of the operations of 1915 may be performed by a determination mode component as described with reference to FIGS. 6 through 9.

At 1920, the UE may determine, within the identified duration, the configuration of the single slot duration in accordance with the first determination mode. The operations of 1920 may be performed according to the methods described herein. In some examples, aspects of the operations of 1920 may be performed by a configuration component as described with reference to FIGS. 6 through 9.

Figure 20:
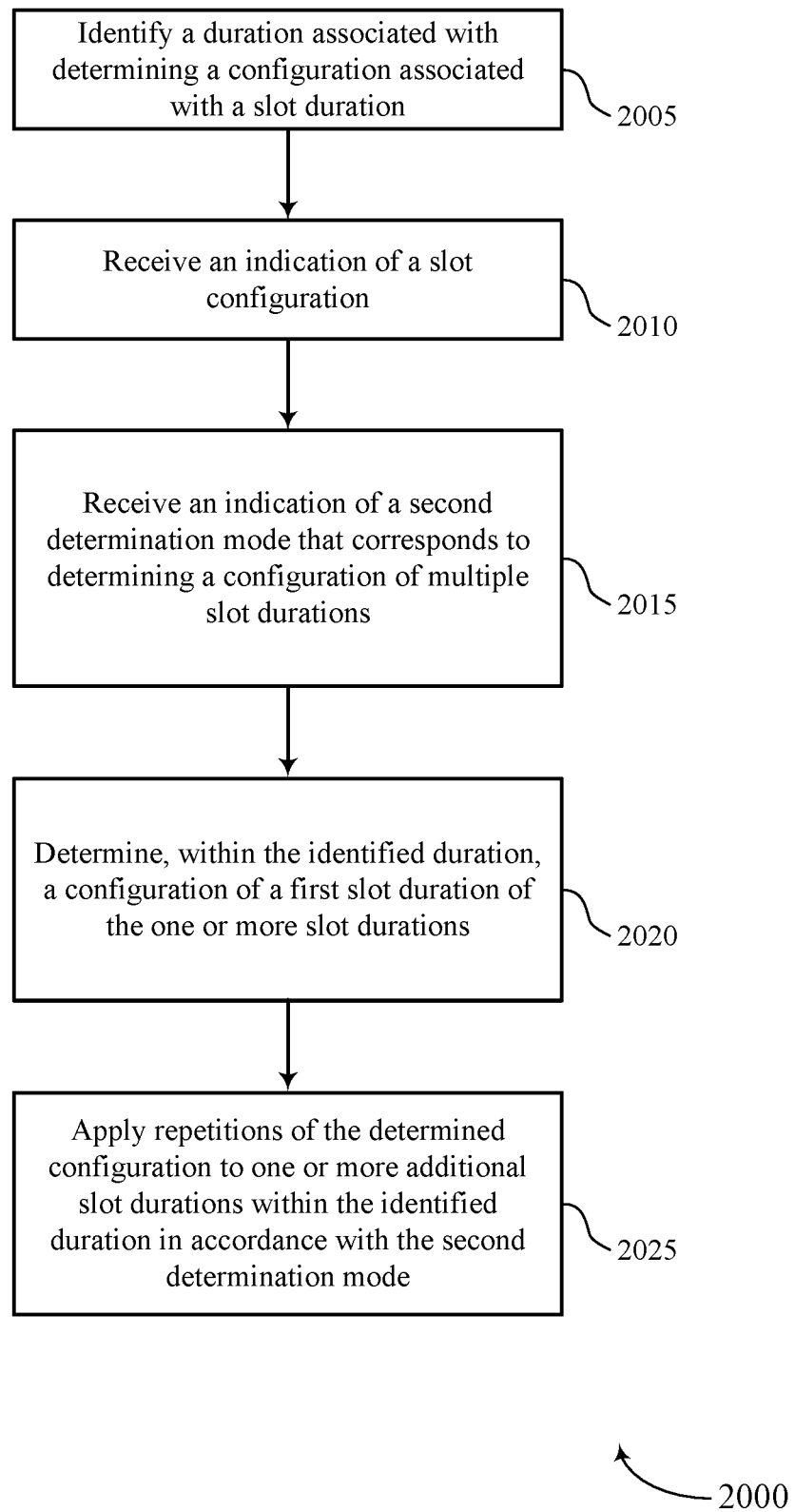

FIG. 20 shows a flowchart illustrating a method 2000 that supports techniques for relaxing a slot format determination in accordance with aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2005, the UE may identify a duration associated with determining a configuration associated with a slot duration. The operations of 2005 may be performed according to the methods described herein. In some examples, aspects of the operations of 2005 may be performed by a time parameter component as described with reference to FIGS. 6 through 9.

At 2010, the UE may receive an indication of a slot configuration. The operations of 2010 may be performed according to the methods described herein. In some examples, aspects of the operations of 2010 may be performed by an indication component as described with reference to FIGS. 6 through 9.

At 2015, the UE may receive an indication of a second determination mode that corresponds to determining a configuration of multiple slot durations, where determining the configuration of the one or more slot durations includes. The operations of 2015 may be performed according to the methods described herein. In some examples, aspects of the operations of 2015 may be performed by a determination mode component as described with reference to FIGS. 6 through 9.

At 2020, the UE may determine, within the identified duration, a configuration of a first slot duration of the one or more slot durations. The operations of 2020 may be performed according to the methods described herein. In some examples, aspects of the operations of 2020 may be performed by a configuration component as described with reference to FIGS. 6 through 9.

At 2025, the UE may apply repetitions of the determined configuration to one or more additional slot durations within the identified duration in accordance with the second determination mode. The operations of 2025 may be performed according to the methods described herein. In some examples, aspects of the operations of 2025 may be performed by a repetition component as described with reference to FIGS. 6 through 9.

Figure 21:
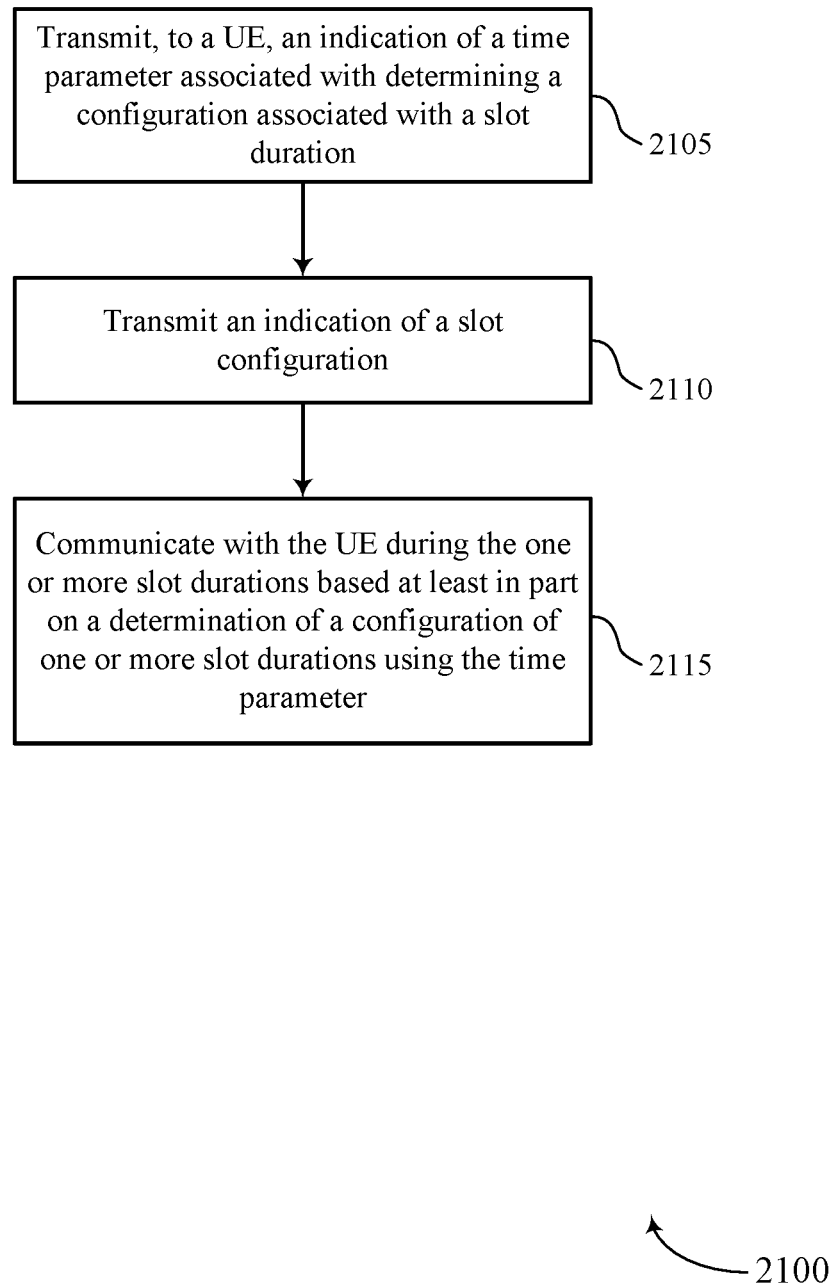

FIG. 21 shows a flowchart illustrating a method 2100 that supports techniques for relaxing a slot format determination in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may transmit, to a UE, an indication of a time parameter associated with determining a configuration associated with a slot duration. The operations of 2105 may be performed according to the methods described herein. In some examples, aspects of the operations of 2105 may be performed by a parameter indication manager as described with reference to FIGS. 10 through 13.

At 2110, the base station may transmit an indication of a slot configuration. The operations of 2110 may be performed according to the methods described herein. In some examples, aspects of the operations of 2110 may be performed by a configuration manager as described with reference to FIGS. 10 through 13.

At 2115, the base station may communicate with the UE during the one or more slot durations based at least in part on a determination of a configuration of one or more slot durations using the time parameter. The operations of 2115 may be performed according to the methods described herein. In some examples, aspects of the operations of 2115 may be performed by a base station communications component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying a time delay associated with determining a configuration associated with a slot duration; receiving an indication of a slot configuration; and determining, after the identified time delay, a configuration of one or more slot durations based at least in part on the received indication of the slot configuration.

Aspect 2: The method of aspect 1, further comprising: receiving an indication of a first determination mode that corresponds to determining a configuration of a single slot duration, wherein determining the configuration of the one or more slot durations comprises: determining, after the identified time delay, the configuration of the single slot duration in accordance with the first determination mode.

Aspect 3: The method of any of aspects 1 through 2, further comprising: receiving an indication of a second determination mode that corresponds to determining a configuration of multiple slot durations, wherein determining the configuration of the one or more slot durations comprises: determining, after the identified time delay, a configuration of a first slot duration of the one or more slot durations; and applying repetitions of the determined configuration to one or more additional slot durations in accordance with the second determination mode, wherein the repetitions are applied based at least in part on a repetition period, or until a second indication of a slot configuration is received, or a combination thereof.

Aspect 4: The method of any of aspects 1 through 3, further comprising: identifying a first communication direction of the one or more slot durations, wherein determining the configuration of the one or more slot durations after the identified time delay is based at least in part on the first communication direction.

Aspect 5: The method of any of aspects 1 through 4, further comprising: identifying a type of a channel scheduled for communication during the one or more slot durations, wherein determining the configuration of the one or more slot durations after the identified time delay is based at least in part on the type of the channel and the type of the channel comprises a physical uplink shared channel, a physical downlink shared channel, or a combination thereof.

Aspect 6: The method of any of aspects 1 through 5, further comprising: receiving an indication of a second slot configuration; and determining, upon receipt of the indication of the second slot configuration, a configuration of a portion of a subsequent slot duration, wherein the configuration of the portion of the subsequent slot duration comprises one or more symbol periods configured for uplink transmissions.

Aspect 7: The method of any of aspects 1 through 6, further comprising: transmitting, to a base station, a capability message that indicates the UE supports the time delay associated with determining the configuration associated with the slot duration, wherein the time delay is identified based at least in part on the transmitted capability message.

Aspect 8: The method of any of aspects 1 through 7, further comprising: transmitting, to a base station, a message that indicates a type of the UE, wherein the time delay is identified based at least in part on the type of the UE.

Aspect 9: The method of any of aspects 1 through 8, further comprising: receiving a radio resource control message comprising an indication of the time delay, wherein the time delay is identified based at least in part on the received radio resource control message.

Aspect 10: The method of any of aspects 1 through 8, further comprising: receiving downlink control information comprising an indication of the time delay, wherein the time delay is identified based at least in part on the received downlink control information.

Aspect 11: The method of any of aspects 1 through 10, wherein receiving the indication of the slot configuration comprises: receiving downlink control information including a slot format indicator comprising the indication of the slot configuration.

Aspect 12: The method of any of aspects 1 through 11, wherein receiving the indication of the slot configuration comprises: receiving UE-specific signaling that includes the indication of the slot configuration.

Aspect 13: The method of any of aspects 1 through 12, further comprising: communicating with a base station during the one or more slot durations based at least in part on the determined configuration of the one or more slot durations, wherein the one or more slot durations comprise slot durations that each include a plurality of flexible symbol periods supporting uplink communication, downlink communication, or a combination thereof.

Aspect 14: A method for wireless communication at a UE, comprising: identifying a duration associated with determining a configuration associated with a slot duration; receiving an indication of a slot configuration; and determining, within the identified duration, a configuration of one or more slot durations based at least in part on the received indication of the slot configuration.

Aspect 15: The method of aspect 14, further comprising: refraining from monitoring for additional indications of slot configurations within the identified duration, wherein the refraining is based at least in part on determining the configuration of the one or more slot durations; and resuming monitoring for the additional indications of the slot configuration upon expiration of the identified duration.

Aspect 16: The method of any of aspects 14 through 15, further comprising: receiving an indication of a first determination mode that corresponds to determining a configuration of a single slot duration, wherein determining the configuration of the one or more slot durations comprises: determining, within the identified duration, the configuration of the single slot duration in accordance with the first determination mode.

Aspect 17: The method of any of aspects 14 through 16, further comprising: receiving an indication of a second determination mode that corresponds to determining a configuration of multiple slot durations, wherein determining the configuration of the one or more slot durations comprises: determining, within the identified duration, a configuration of a first slot duration of the one or more slot durations; and applying repetitions of the determined configuration to one or more additional slot durations within the identified duration in accordance with the second determination mode, wherein the repetitions are applied based at least in part on a repetition period, or until a second indication of a slot configuration is received, or a combination thereof.

Aspect 18: The method of any of aspects 14 through 17, further comprising: identifying a first communication direction of the one or more slot durations; and identifying a type of a channel scheduled for communication during the one or more slot durations, the type of the channel comprising a physical uplink shared channel, a physical downlink shared channel, or a combination thereof, wherein determining the configuration of the one or more slot durations within the identified duration is based at least in part on the first communication direction, the type of the channel, or both.

Aspect 19: The method of any of aspects 14 through 18, further comprising: determining, upon receipt of the indication of the slot configuration, a configuration of a portion of a slot duration of the one or more slot durations within the identified duration, wherein the configuration of the portion of the slot duration comprises one or more symbol periods configured for uplink transmissions.

Aspect 20: The method of any of aspects 14 through 19, further comprising: transmitting, to a base station, a capability message that indicates the UE supports the duration associated with determining the configuration associated with the slot duration, wherein identifying the duration is based at least in part on the capability message.

Aspect 21: The method of any of aspects 14 through 20, further comprising: transmitting, to a base station, a message that indicates a type of the UE, wherein identifying the duration is based at least in part on the type of the UE.

Aspect 22: The method of any of aspects 14 through 21, further comprising: communicating with a base station during the one or more slot durations based at least in part on the determined configuration of the one or more slot durations, wherein the one or more slot durations comprise slot durations that each include a plurality of flexible symbol periods supporting uplink communication, downlink communication, or a combination thereof.

Aspect 23: A method for wireless communication at a base station, comprising: transmitting, to a UE, an indication of a time parameter associated with determining a configuration associated with a slot duration; transmitting an indication of a slot configuration; and communicating with the UE during the one or more slot durations based at least in part on a determination of a configuration of one or more slot durations using the time parameter.

Aspect 24: The method of aspect 23, further comprising: receiving, from the UE, a capability message that indicates the UE supports the time parameter for determining the configuration associated with the slot duration, wherein transmitting the indication of the time parameter is based at least in part on the received capability message.

Aspect 25: The method of any of aspects 23 through 24, further comprising: receiving, from the UE, a message that indicates a type of the UE, wherein transmitting the indication of the time parameter is based at least in part on the type of the UE.

Aspect 26: The method of any of aspects 23 through 25, further comprising: identifying an operational mode of the UE, wherein transmitting the indication of the time parameter is based at least in part on the operational mode of the UE.

Aspect 27: The method of any of aspects 23 through 26, further comprising: transmitting an indication of a first determination mode that corresponds to determining a configuration of a single slot duration based at least in part on the time parameter.

Aspect 28: The method of any of aspects 23 through 27, further comprising: transmitting an indication of a second determination mode that corresponds to determining a configuration of multiple slot durations based at least in part on the time parameter.

Aspect 29: The method of any of aspects 23 through 28, wherein the time parameter comprises a time delay associated with determining a configuration associated with a slot duration, or a duration associated with determining a configuration of a slot duration, or a combination thereof.

Aspect 30: An apparatus for wireless communication at a UE, comprising a processor; memory coupled with the processor; and instructions stored in the memory and executable by the processor to cause the apparatus to perform a method of any of aspects 1 through 13.

Aspect 31: An apparatus for wireless communication at a UE, comprising at least one means for performing a method of any of aspects 1 through 13.

Aspect 32: A non-transitory computer-readable medium storing code for wireless communication at a UE, the code comprising instructions executable by a processor to perform a method of any of aspects 1 through 13.

Aspect 33: An apparatus for wireless communication at a UE, comprising a processor; memory coupled with the processor; and instructions stored in the memory and executable by the processor to cause the apparatus to perform a method of any of aspects 14 through 22.

Aspect 34: An apparatus for wireless communication at a UE, comprising at least one means for performing a method of any of aspects 14 through 22.

Aspect 35: A non-transitory computer-readable medium storing code for wireless communication at a UE, the code comprising instructions executable by a processor to perform a method of any of aspects 14 through 22.

Aspect 36: An apparatus for wireless communication at a base station, comprising a processor; memory coupled with the processor; and instructions stored in the memory and executable by the processor to cause the apparatus to perform a method of any of aspects 23 through 29.

Aspect 37: An apparatus for wireless communication at a base station, comprising at least one means for performing a method of any of aspects 23 through 29.

Aspect 38: A non-transitory computer-readable medium storing code for wireless communication at a base station, the code comprising instructions executable by a processor to perform a method of any of aspects 23 through 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a time delay associated with determining a configuration associated with a slot duration;
   receiving an indication of a slot configuration; and
   determining a configuration comprising a communication direction of one or more slot durations that are after the identified time delay based at least in part on the received indication of the slot configuration.

2. The method of claim 1, further comprising:
   receiving an indication of a first determination mode that corresponds to determining a configuration of a single slot duration, wherein determining the configuration of the one or more slot durations comprises:
   determining, after the identified time delay, the configuration of the single slot duration in accordance with the first determination mode.

3. The method of claim 1, further comprising:
   receiving an indication of a second determination mode that corresponds to determining a configuration of multiple slot durations, wherein determining the configuration of the one or more slot durations comprises:
   determining, after the identified time delay, a configuration of a first slot duration of the one or more slot durations; and
   applying repetitions of the determined configuration to one or more additional slot durations in accordance with the second determination mode, wherein the repetitions are applied based at least in part on a repetition period, or until an indication of a second slot configuration is received, or a combination thereof.

4. The method of claim 1, further comprising:
   identifying a first communication direction of the one or more slot durations, wherein determining the configuration of the one or more slot durations that are after the identified time delay is based at least in part on the first communication direction.

5. The method of claim 1, further comprising:
   identifying a type of a channel scheduled for communication during the one or more slot durations, wherein determining the configuration of the one or more slot durations that are after the identified time delay is based at least in part on the type of the channel and the type of the channel comprises a physical uplink shared channel, a physical downlink shared channel, or a combination thereof.

6. The method of claim 1, further comprising:
   receiving an indication of a second slot configuration; and
   determining, upon receipt of the indication of the second slot configuration, a configuration of a portion of a subsequent slot duration, wherein the configuration of the portion of the subsequent slot duration comprises one or more symbol periods configured for uplink transmissions.

7. The method of claim 1, further comprising:
   transmitting, to a base station, a capability message that indicates the UE supports the time delay associated with determining the configuration associated with the slot duration, wherein the time delay is identified based at least in part on the transmitted capability message.

8. The method of claim 1, further comprising:
   transmitting, to a base station, a message that indicates a type of the UE, wherein the time delay is identified based at least in part on the type of the UE.

9. The method of claim 1, further comprising:
   receiving a radio resource control message comprising an indication of the time delay, wherein the time delay is identified based at least in part on the received radio resource control message.

10. The method of claim 1, further comprising:
    receiving downlink control information comprising an indication of the time delay, wherein the time delay is identified based at least in part on the received downlink control information.

11. The method of claim 1, wherein receiving the indication of the slot configuration comprises:
    receiving downlink control information including a slot format indicator comprising the indication of the slot configuration.

12. The method of claim 1, wherein receiving the indication of the slot configuration comprises:
    receiving UE-specific signaling that includes the indication of the slot configuration.

13. The method of claim 1, further comprising:
    communicating with a base station during the one or more slot durations based at least in part on the determined configuration of the one or more slot durations, wherein the one or more slot durations comprise slot durations that each include a plurality of flexible symbol periods supporting uplink communication, downlink communication, or a combination thereof.

14. A method for wireless communication at a user equipment (UE), comprising:
    identifying a duration associated with determining a configuration associated with a slot duration;
    receiving an indication of a slot configuration; and
    determining a configuration comprising a communication direction of one or more slot durations that are within the duration based at least in part on the received indication of the slot configuration.

15. The method of claim 14, further comprising:
    refraining from monitoring for additional indications of slot configurations within the identified duration, wherein the refraining is based at least in part on determining the configuration of the one or more slot durations; and
    resuming monitoring for the additional indications of the slot configuration upon expiration of the identified duration.

16. The method of claim 14, further comprising:
receiving an indication of a first determination mode that corresponds to determining a configuration of a single slot duration, wherein determining the configuration of the one or more slot durations comprises:
determining, within the identified duration, the configuration of the single slot duration in accordance with the first determination mode.

17. The method of claim 14, further comprising:
receiving an indication of a second determination mode that corresponds to determining a configuration of multiple slot durations, wherein determining the configuration of the one or more slot durations comprises:
determining, within the identified duration, a configuration of a first slot duration of the one or more slot durations; and
applying repetitions of the determined configuration to one or more additional slot durations within the identified duration in accordance with the second determination mode, wherein the repetitions are applied based at least in part on a repetition period, or until an indication of a second slot configuration is received, or a combination thereof.

18. The method of claim 14, further comprising:
identifying a first communication direction of the one or more slot durations; and
identifying a type of a channel scheduled for communication during the one or more slot durations, the type of the channel comprising a physical uplink shared channel, a physical downlink shared channel, or a combination thereof, wherein determining the configuration of the one or more slot durations within the identified duration is based at least in part on the first communication direction, the type of the channel, or both.

19. The method of claim 14, further comprising:
determining, upon receipt of the indication of the slot configuration, a configuration of a portion of a first slot duration of the one or more slot durations within the identified duration, wherein the configuration of the portion of the first slot duration comprises one or more symbol periods configured for uplink transmissions.

20. The method of claim 14, further comprising:
transmitting, to a base station, a capability message that indicates the UE supports the duration associated with determining the configuration associated with the slot duration, wherein identifying the duration is based at least in part on the capability message.

21. The method of claim 14, further comprising:
transmitting, to a base station, a message that indicates a type of the UE, wherein identifying the duration is based at least in part on the type of the UE.

22. The method of claim 14, further comprising:
communicating with a base station during the one or more slot durations based at least in part on the determined configuration of the one or more slot durations, wherein the one or more slot durations comprise slot durations that each include a plurality of flexible symbol periods supporting uplink communication, downlink communication, or a combination thereof.

23. A method for wireless communication at a base station, comprising:
transmitting, to a user equipment (UE), an indication of a parameter associated with a time duration for determining a configuration associated with a slot duration;
transmitting an indication of a slot configuration; and
communicating with the UE during one or more slot durations that are within or after the time duration based at least in part on a determination of a configuration comprising a communication direction of the one or more slot durations, the determination based at least in part on the indication.

24. The method of claim 23, further comprising:
receiving, from the UE, a capability message that indicates the UE supports the time parameter for determining the configuration associated with the slot duration, wherein transmitting the indication of the time parameter is based at least in part on the received capability message.

25. The method of claim 23, further comprising:
receiving, from the UE, a message that indicates a type of the UE, wherein transmitting the indication of the time parameter is based at least in part on the type of the UE.

26. The method of claim 23, further comprising:
identifying an operational mode of the UE, wherein transmitting the indication of the time parameter is based at least in part on the operational mode of the UE.

27. The method of claim 23, further comprising:
transmitting an indication of a first determination mode that corresponds to determining a configuration of a single slot duration based at least in part on the time parameter.

28. The method of claim 23, further comprising:
transmitting an indication of a second determination mode that corresponds to determining a configuration of multiple slot durations based at least in part on the time parameter.

29. The method of claim 23, wherein the time parameter comprises a time delay associated with determining a configuration associated with the slot duration, or a duration associated with determining a configuration of the slot duration, or a combination thereof.

30. An apparatus for wireless communication at a user equipment (UE), comprising:
at least one processor,
memory coupled with the at least one processor; and
instructions stored in the memory and executable by the at least one processor to cause the apparatus to:
identify a time delay associated with determining a configuration associated with a slot duration;
receive an indication of a slot configuration; and
determine a configuration comprising a communication direction of one or more slot durations that are after the identified time delay based at least in part on the received indication of the slot configuration.

* * * * *